(12) United States Patent
Hayashi et al.

(10) Patent No.: US 7,236,645 B2
(45) Date of Patent: Jun. 26, 2007

(54) IMAGE SYNTHESIZING APPARATUS AND METHOD

(75) Inventors: Hiroshi Hayashi, Kanagawa (JP); Satoshi Yamada, Tokyo (JP); Ken Hayakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 10/392,052

(22) Filed: Mar. 19, 2003

(65) Prior Publication Data

US 2003/0179952 A1 Sep. 25, 2003

(30) Foreign Application Priority Data

Mar. 20, 2002 (JP) ............................ P2002-078045

(51) Int. Cl.
*G06K 9/36* (2006.01)
*G09G 5/00* (2006.01)
*H04N 9/74* (2006.01)

(52) U.S. Cl. ...................... 382/284; 345/640; 348/585; 348/590

(58) Field of Classification Search ................ 382/284; 345/634, 637, 639–641; 348/584–595
See application file for complete search history.

(56) References Cited

U.S. PATENT DOCUMENTS

| 4,507,681 | A | * | 3/1985 | Verhoeven et al. ........ 378/98.7 |
| 5,872,553 | A | * | 2/1999 | Strickling, III ............. 345/619 |
| 6,629,107 | B1 | * | 9/2003 | Ouchi et al. ............. 707/104.1 |
| 7,027,616 | B2 | * | 4/2006 | Ishii et al. .................. 382/104 |
| 2005/0190955 | A1 | * | 9/2005 | Brown ........................ 382/128 |

* cited by examiner

*Primary Examiner*—Matthew C. Bella
*Assistant Examiner*—Yubin Hung
(74) *Attorney, Agent, or Firm*—Frommer Lawrence & Haug LLP; William S. Frommer; Thomas F. Presson

(57) ABSTRACT

An α value in a desired shape in a desired position can be rewritten to a desired value in a desired range. α value rewriting units for rewriting an α value showing an opaqueness degree of an image are provided. When the desired position comes, an area setting signal is outputted in a desired shape from an area setting signal generating unit. While the area setting signal is being outputted, in the α value rewriting unit, an α value of inputted image data is rewritten to a desired value. The rewriting of the α value can be dynamically realized independent of software. By preparing a quadrangular area calculating unit and a circular area calculating unit as an area setting signal generating unit, a quadrangular area and a circular area can be set by hardware.

12 Claims, 16 Drawing Sheets

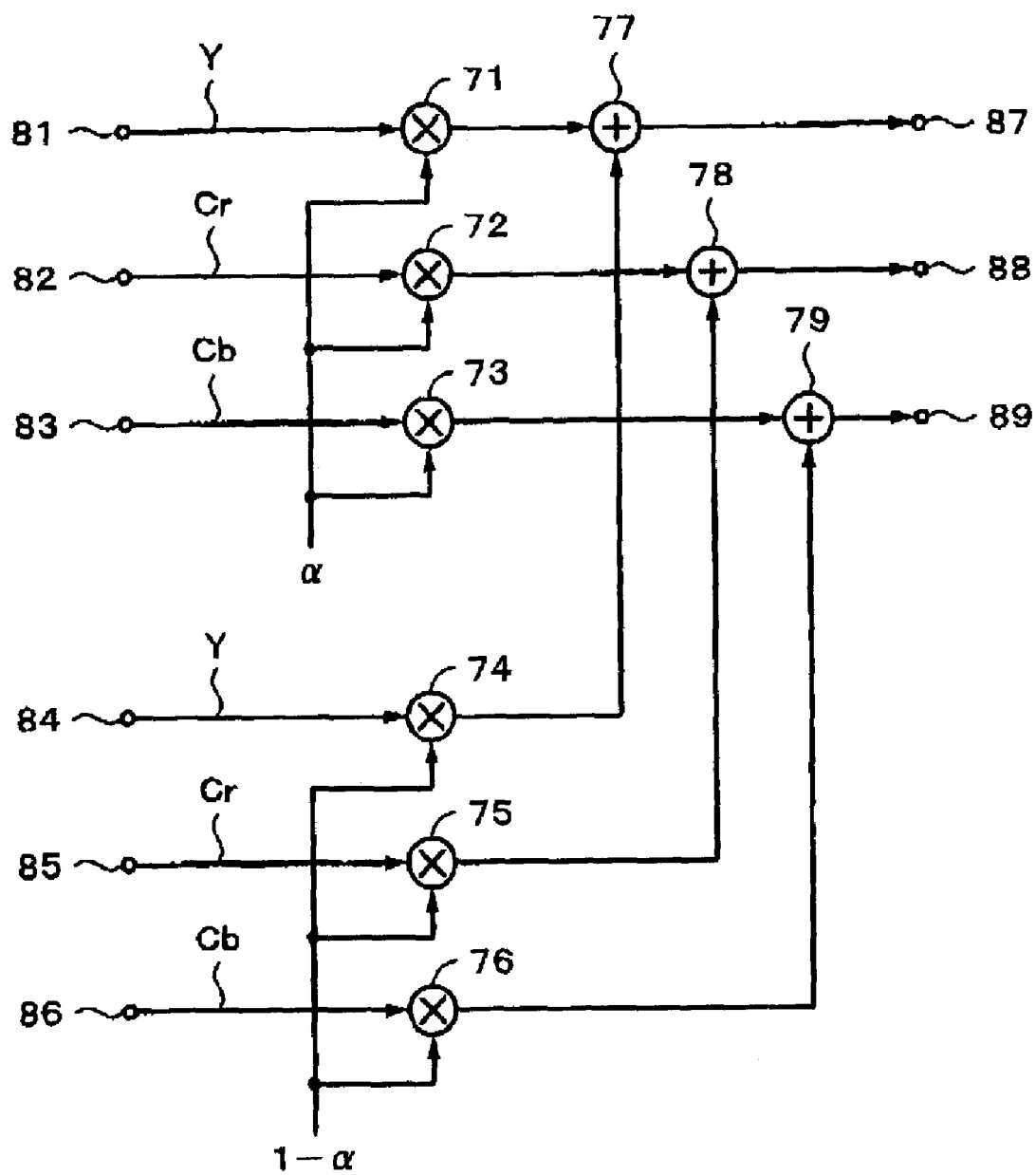

| ADDRESS | HORIZONTAL DIRECTION SIZE |
|---|---|
| 0 | Xs0 |
| 1 | Xs1 |
| 2 | Xs2 |
| 3 | Xs3 |
| 4 | Xs4 |
| 5 | Xs5 |
| 6 | Xs6 |
| 7 | Xs7 |
| 8 | Xs8 |
| 9 | Xs9 |
| 10 | Xs10 |

IMAGE SYNTHESIZING APPARATUS AND METHOD

BACKGROUND OF THE INVENTION

1. Field of the Invention

The invention relates to image synthesizing apparatus and method for synthesizing images in accordance with an α value showing an opaqueness degree and, more particularly, to image synthesizing apparatus and method for enabling an α value of a desired shape in a desired position to be rewritten to a desired value in a desired range.

2. Description of the Related Arts

Development of an image processing chip for processing image data transmitted by digital CS (Communication Satellite) broadcast, digital BS (Broadcast Satellite) broadcast, or digital CATV (Cable Television) broadcast is being progressed. Such an image processing chip has a motion image processor, a display processor, a BitBLT (Bit Block Transfer) engine, a JPEG (Joint Photographic Experts Group) engine, and the like. A host CPU and a memory are externally connected to such an image processing chip.

Motion image data is supplied to the motion image processor. The motion image processor executes format conversion or the like to the motion image data. The motion image data in a format comprising an opaqueness degree α, luminance Y, and color differences Cr and Cb is outputted from the motion image processor. The motion image data from the motion image processor is sent to the display processor and a background image such as OSD (On Screen Display), EPG (Electronic Program Guide), capture display screen, or the like is synthesized to the motion image by the display processor. When the images are synthesized as mentioned above, α blending is executed.

The α blending is intended for synthesizing a plurality of images in accordance with transparency and an α value is used as a value indicative of the opaqueness degree. For example, when the α value is equal to "1", the image is opaque. If the image whose α value is equal to "1" is synthesized, the under image cannot be seen in an overlapped position of the images. On the other hand, when the α value is equal to "0", the image is transparent. If the image whose α value is equal to "0" is synthesized, the under image shows through in an overlapped position of the images. When the α value is equal to "0.5", the image is translucent and an image in which the top image and the under image are evenly mixed is seen in an overlapped position of the images.

The α blending for synthesizing the images in accordance with the α value as mentioned above can be fundamentally constructed by a multiplier 201 for multiplying one image data by the α value, a multiplier 202 for multiplying the other image data by a (1−α) value, and an adder 203 for adding an output of the multiplier 201 and an output of the multiplier 202 as shown in FIG. 18.

Owing to such a construction, now assuming that the image data from an input terminal 200 is set to G1 and the image data from an input terminal 204 is set to G2, the following arithmetic operation is executed.

$$\alpha \cdot G1 + (1-\alpha) \cdot G2$$

Thus, an image which is outputted from an output terminal 205 becomes an image in which the inputted image data G1 and G2 have been weighted by the opaqueness degree according to the α values and synthesized.

FIG. 19 shows an example of a conventional blender which is installed in a digital image signal processing chip.

In FIG. 19, a memory 251 and a host CPU (Central Processing unit) 252 are provided out of the image signal processing chip in which a blender 253 is installed.

Image data which is obtained by decoding a reception signal of, for example, the digital CS broadcast, digital BS broadcast, digital CATV broadcast, or the like is outputted from a motion image processor 254 arranged in the image signal processing chip. The image data has a format of, for example, (α, Y, Cr, Cb). The image data is supplied to motion image input units 221 and 222.

Image data serving as background images is read out from the memory 251 and sent to background image reading units 223 and 224. The image data stored in the memory 251 has a format of, for example, (α, Y, Cr, Cb).

The image data inputted to the motion image input units 221 and 222 and the image data read out to the background image reading units 223 and 224 are supplied to an α blending synthesizing unit 235. All of the image data inputted to the motion image input units 221 and 222 and the image data read out to the background image reading units 223 and 224 are synchronized by a sync control unit 225.

The α blending synthesizing unit 235 synthesizes the image data from the motion image input units 221 and 222 and the image data from the background image reading units 223 and 224 in accordance with the α values.

In the α blending synthesizing unit 235, the image data inputted to the motion image input units 221 and 222 and the image data read out to the background image reading units 223 and 224 are synthesized on the basis of the α values. The image data synthesized as mentioned above is outputted from output terminals 236 and 237.

As mentioned above, in the α blending, the image data is synthesized on the basis of the α value showing the opaqueness degree. When the α value is equal to (α=1), the image is opaque. When the α value is equal to (α=0), the image is transparent. If the α value can be updated to a desired value in a desired range, the image in a desired area of the image can be gradually visualized or gradually widened or narrowed like a wiping process.

In the conventional blender, however, a function such that the α value of a part of the image is changed in a range shown in an arbitrary shape with respect to each of the inputted images is not provided. The process for rewriting the α value can be realized by the software process also in the conventional blender. However, if it is tried to execute the process for rewriting the α value by software, the operations for reading out the image data stored in the memory 251, directly rewriting the α value in a software manner by using the host CPU 252, thereafter, writing the image data into the memory 251, and reading it out again from the memory 251 by the background image reading units 223 and 224 are necessary, so that a burden on the host CPU 252 is increased.

The image data which is inputted to the motion image input units 221 and 222 is the motion image data formed by decoding the reception signal of, for example, the digital CS broadcast or digital BS broadcast and is not stored into the memory 251. Therefore, with respect to the image data of the motion image which is inputted to the motion image input units 221 and 222, it is difficult to partially rewrite the α value by software.

OBJECTS AND SUMMARY OF THE INVENTION

It is, therefore, an object of the invention to provide image synthesizing apparatus and method which can rewrite an α value of a desired shape in a desired position to a desired value in a desired range.

Another object of the invention is to provide image synthesizing apparatus and method which can execute a high-speed operation and dynamically rewrite an α value even with respect to image data of a motion image which is inputted.

According to the first aspect of the invention, there is provided an image synthesizing apparatus comprising: input means for inputting image data including a value of an opaqueness degree; area setting means for setting a rewriting range of the opaqueness degree in a desired shape in a desired position and generating an area setting signal when a present position of the inputted image data enters the set rewriting range; opaqueness degree rewriting means for rewriting a value of the opaqueness degree of the inputted image data to a desired value while the area setting signal is being generated; and synthesizing means for synthesizing the image data in which the opaqueness degree has been rewritten in the desired shape in the desired position and another image data in accordance with the value of the rewritten opaqueness degree.

According to the second aspect of the invention, there is provided an image synthesizing method comprising the steps of inputting image data including a value of an opaqueness degree; setting a rewriting range of the opaqueness degree in a desired shape in a desired position and generating an area setting signal when a present position of the inputted image data enters the set rewriting range; rewriting a value of the opaqueness degree of the inputted image data to a desired value while the area setting signal is being generated; and synthesizing the image data in which the opaqueness degree has been rewritten in the desired shape in the desired position and another image data in accordance with the value of the rewritten opaqueness degree.

According to the invention, an α value rewriting unit for rewriting an α value indicative of the opaqueness degree of the image is provided. When the desired position comes, the area setting signal is generated in the desired shape from an area setting signal generating unit. While the area setting signal is being generated, the α value of the inputted image data can be rewritten to the desired value.

As mentioned above, the rewriting of the α value showing the opaqueness degree can be dynamically realized independent of software. Therefore, the rewriting process of the opaqueness degree using a CPU which needs transmission and reception of data to/from a memory becomes unnecessary and reduction of processing time can be realized.

According to the invention, the opaqueness degree can be partially changed not only with respect to the image data which is read out from the memory but also with respect to image data which is directly inputted like a motion image. Since the reduction of the processing time is realized, a set value can be dynamically changed. By dynamically changing the opaqueness degree, a wiping process or an image process such that the image appears or disappears gradually can be realized.

According to the invention, by preparing a quadrangular area calculating unit and a circular area calculating unit, a quadrangular area and a circular area can be set by hardware. In the circular area calculating unit, by using a reference circle conversion table, the circular area can be set without executing a complicated arithmetic operation. Thus, the rewriting areas of the quadrangular shape and the circular shape can be set by a high-speed process.

The above and other objects and features of the present invention will become apparent from the following detailed description and the appended claims with reference to the accompanying drawings.

BRIEF DESCRIPTION OF THE DRAWINGS

FIG. 4 is a block diagram of an example of an α blending unit;

DETAILED DESCRIPTION OF THE PREFERRED EMBODIMENT

Figure 1:
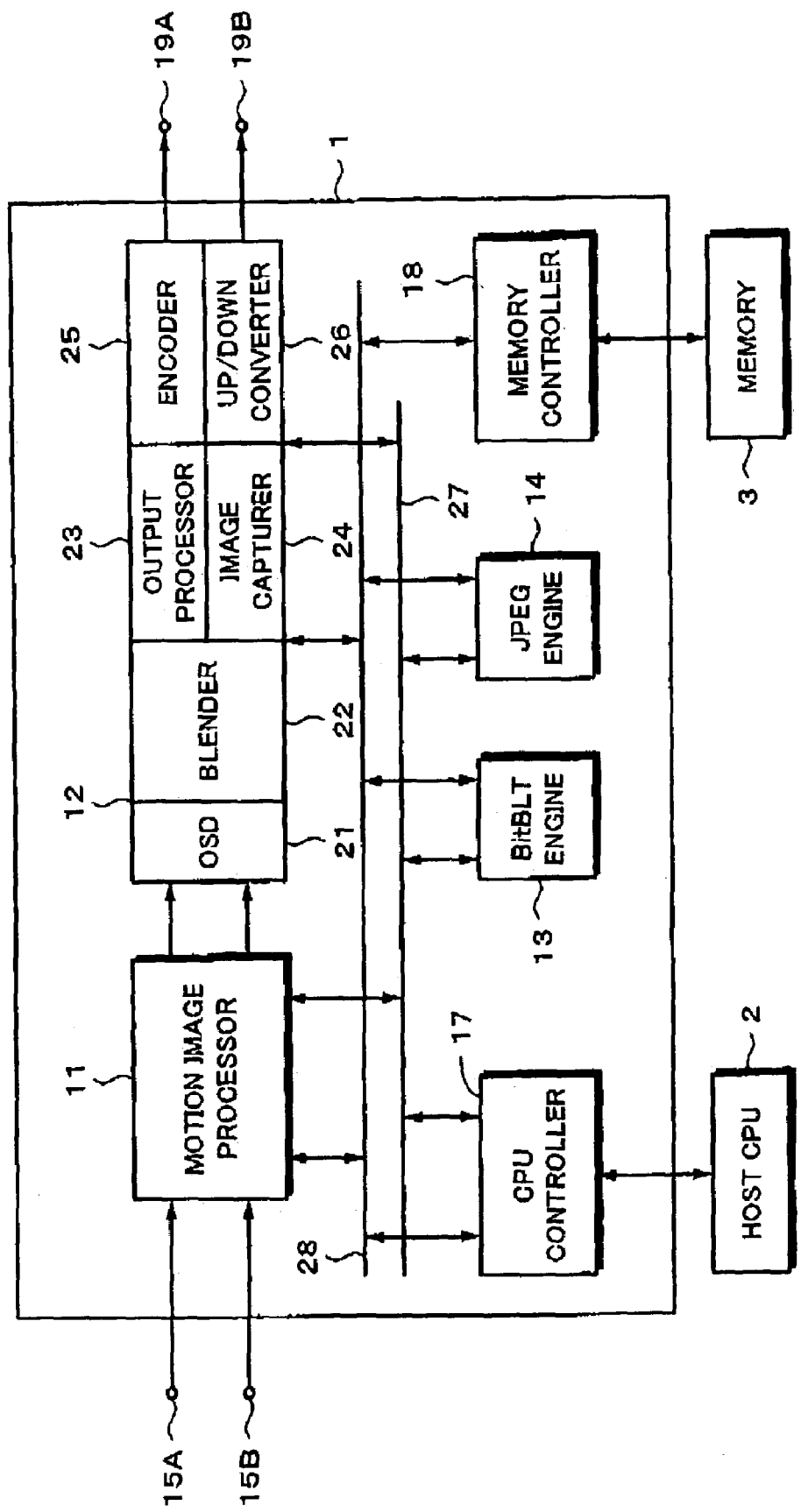
FIG. 1 is a block diagram of an example of an image processing chip to which the invention can be applied.

An embodiment of the invention will be described hereinbelow with reference to the drawings. FIG. 1 shows an image processing chip to which the invention can be applied. An image processing chip 1 is used in a set-top box or a television receiver of the digital CS broadcast, digital BS broadcast, or digital CATV broadcast in order to process image data transmitted by, for example, the digital CS broadcast, digital BS broadcast, or digital CATV broadcast.

As shown in FIG. 1, the image processing chip 1 has a motion image processor 11, a display processor 12, a BitBLT engine 13, a JPEG engine 14, and the like. Each of the processors 11, 12, 13, and 14 is connected via a system bus 27 and a memory bus 28. A host CPU 2 is externally connected to the image processing chip 1 via a CPU controller 17. A memory 3 is also externally connected to the image processing chip 1 via a memory controller 18.

Image data of a motion image obtained by decoding a reception signal of the digital CS broadcast, digital BS broadcast, digital CATV broadcast, or the like is supplied from input terminals 15A and 15B. The motion image processor 11 executes format conversion or the like to the image data. The image data of the motion image in a format of (α, Y, Cr, Cb) is outputted from the motion image processor 11.

The image date of the motion image from the motion image processor 11 is sent to the display processor 12. The display processor 12 comprises: an OSD circuit unit 21 for realizing a function of an OSD for multiplexing an image to a display screen of the motion image; a blender 22 for realizing an α blending function for synthesizing a plurality of display screens in accordance with transparency; an output processor 23; an image capturer 24; an encoder 25 for encoding the reception signal into a video signal of an NTSC system or a PAL system; an up/down converter 26 for executing conversion of an HD (High Definition) image and an SD (Standard Definition) image; and the like. An output of the display processor 12 is outputted from output terminals 19A and 19B.

The BitBLT engine 13 and the JPEG engine 14 are provided for the image processing chip 1. The BitBLT engine 13 is a hardware accelerator for performing processes such as copy, color expansion. YC mixing, color conversion, α blending, and scaling of the display screen. The JPEG engine 14 executes encoding and decoding of JPEG.

The invention is used to realize a function of the blender 22 in the display processor 12 of the foregoing image processing chip 1. The blender 22 synthesizes the image data of the motion image from the motion image processor 11 and a variety of background display screens such as background display screen, application display screen, EPG display screen, still image, caption, and the like. The background display screens are stored into the memory 3 and transferred to the display processor 12 via the memory controller 18 and the memory bus 28. In the blender 22, the display screens are synthesized by α blending on the basis of the value of α.

Figure 2:
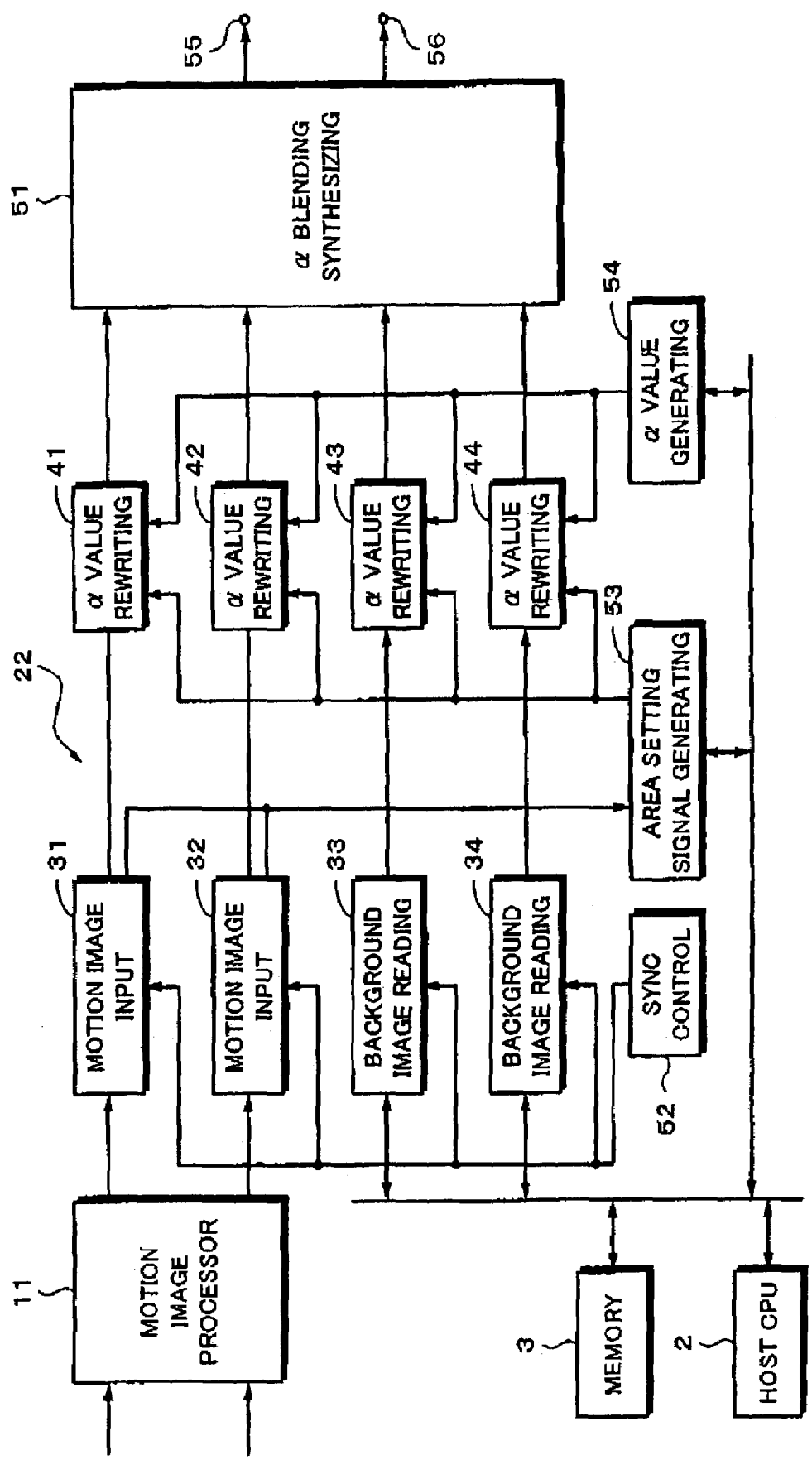
FIG. 2 is a block diagram of an example of a blender to which the invention is applied.

FIG. 2 shows an example of the blender 22 to which the invention is applied. The blender 22 has: motion image input units 31 and 32 to which the image data of the motion image from the motion image processor 11 is inputted; background image reading units 33 and 34 to which the image data of the background images read out from the memory 3 is inputted; α value rewriting units 41, 42, 43, and 44 for rewriting the α value; and an α blending synthesizing unit 51 for synthesizing the image data on the basis of the α value. The blender 22 also has: a sync control unit 52 for synchronizing each of the image data; an area setting signal generating unit 53 for setting a rewriting area of the α value; and an α value generating unit 54 for generating the α value to be rewritten.

The inputted image data of the motion image is supplied to the motion image input units 31 and 32 from the motion image processor 11. Outputs of the motion image input units 31 and 32 are supplied to the α value rewriting units 41 and 42. The image data which is inputted to the motion image input units 31 and 32 is not limited to the image data of the motion image. Image data of a still image can be also inputted.

The image data of a still image, a motion image, or an animation image serving as a background image is supplied to the memory 3. The image data serving as a background has a format of (α, Y, Cr, Cb). The image data inputted to the memory 3 is supplied to the background image reading units 33 and 34. Outputs of the background image reading units 33 and 34 are supplied to the α value rewriting units 43 and 44.

Parameters for rewriting the α value are supplied to the area setting signal generating unit 53 from the host CPU 2. The parameters comprise shape information on the rewriting destination side, position information on the rewriting destination side, range information on the rewriting destination side, and output destination information. Information of a display position of the present image is transmitted to the area setting signal generating unit 53 from the motion image input units 31 and 32. The rewriting α value is supplied to the α value generating unit 54 from the host CPU 2.

When a desired position set by the parameters comes, an area setting signal is outputted from the area setting signal generating unit 53 to the α value rewriting units 41, 42, 43, and 44 on the output destination side in the area of a desired shape. While the area setting signal is being inputted, each of the α value rewriting units 41, 42, 43, and 44 executes a process for rewriting the α value of the inputted image data into the α value which is outputted from the α value generating unit 54. Thus, when the desired position comes, the α value of the image data inputted to the motion image input units 31 and 32 and that of the image data inputted to the background image reading units 33 and 34 are rewritten into the desired α value in a desired area in a desired shape.

Figure 3:
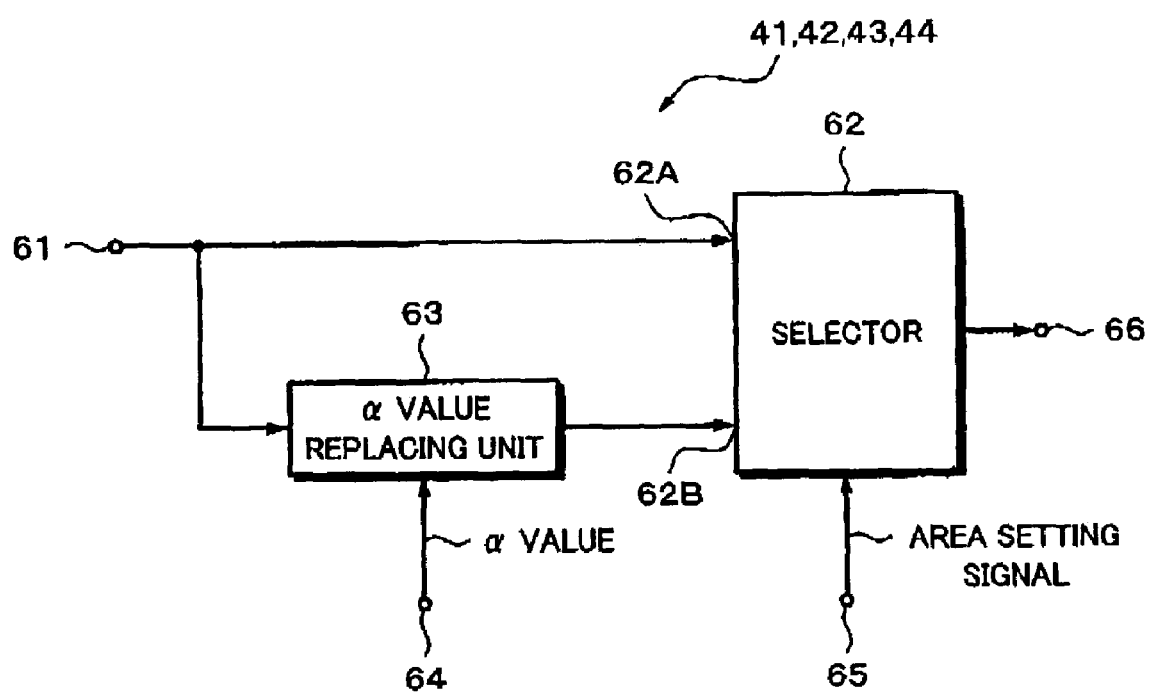
FIG. 3 is a block diagram of an example of a Construction of an α value rewriting unit.

Each of the α value rewriting units 41, 42, 43, and 44 is constructed as shown in, for example, FIG. 3.

In FIG. 3, the image data is supplied to an input terminal 61. The image data is supplied to a terminal 62A side of a selector 62 and to an α value replacing unit 63. The α value obtained after the rewriting is supplied from an input terminal 64 to the α value replacing unit 63. In the α value replacing unit 63, the α value of the image data from the input terminal 61 is replaced. An output of the α value replacing unit 63 is supplied to a terminal 625 side of the selector 62.

The area setting signal is supplied to the selector 62 from an input terminal 65. The area setting signal is supplied from the area setting signal generating unit 53. The selector 62 is switched by the area setting signal from the input terminal 65.

When the area setting signal is not inputted to the input terminal 65, the selector 62 is set to the terminal 62A side. Therefore, when the area setting signal is not inputted, the image data from the input terminal 61 is outputted as it is from an output terminal 66 via the selector 62.

When the area setting signal is inputted to the input terminal 65, the selector 62 is set to the terminal 62B side. Therefore, when the area setting signal is inputted, the α value of the image data from the input terminal 61 is replaced with the α value from the input terminal 64 by the α value replacing unit 63. The image data in which the α value has been replaced is outputted from the output terminal 66 via the selector 62.

For example, it is now assumed that the image data of (α1, Y1, Cr1, Cb1) is inputted to the input terminal 61. It is also assumed that α2 is inputted as a rewriting α value from the input terminal 64. When the area setting signal is not inputted, the selector 62 is set to the terminal 62A side. The image data (α1, Y1, Cr1, Cb1) from the input terminal 61 is outputted as it is from the output terminal 66. When the area setting signal is inputted, the selector 62 is switched to the terminal 62B side. The α value in the image data from the input terminal 61 is rewritten from α1 to α2 and image data (α2, Y1, Cr1, Cb1) is outputted from the output terminal 66.

In FIG. 2, the image data transmitted via the α value rewriting units 41, 42, 43, and 44 is supplied to the α blending synthesizing unit 51. The α blending synthesizing unit 51 synthesizes the respective image data on the basis of the opaqueness degree according to the α value.

As shown in FIG. 4, the α blending synthesizing unit 51 fundamentally comprises: multipliers 71, 72, and 73 for multiplying the luminance data Y and the color difference data Cr and Cb of one of the image data by the α value, respectively; multipliers 74, 75, and 76 for multiplying the luminance data Y and the color difference data Cr and Cb of the other image data by the (1−α) value, respectively; and adders 17, 78, and 79 for adding outputs of the multipliers 71, 72, and 73 and outputs of the multipliers 74, 75, and 76, respectively. The images have priorities. When the images are synthesized, they are synthesized by using the α value of the image having the higher priority.

The luminance data Y and the color difference data Cr and Cb of one image data are supplied to input terminals 81, 82, and 83, respectively. The luminance data Y and the color difference data Cr and Cb of one image data from the input terminals 81, 82, and 83 are supplied to the multipliers 71, 72, and 73, respectively. In the multipliers 71, 72, and 73, the luminance data Y and the color difference data Cr and Cb of one image data are multiplied by the α value, respectively.

The luminance data Y and the color difference data Cr and Cb of the other image data are supplied to input terminals 84, 85, and 86, respectively. The luminance data Y and the color difference data Cr and Cb of the other image data from the input terminals 84, 85, and 86 are supplied to the multipliers 74, 75, and 76, respectively. In the multipliers 74, 75, and 76, the luminance data Y and the color difference data Cr and Cb of the other image data are multiplied by the (1−α) value, respectively.

The outputs of the multipliers 71, 72, and 73 are supplied to the adders 77, 78, and 79, respectively. The outputs of the multipliers 74, 75, and 76 are also supplied to the adders 77, 78, and 79, respectively. Outputs of the adders 77, 78, and 79 are outputted from output terminals 87, 88, and 89, respectively. α blending outputs in which image data from the input terminals 81, 82, and 83 and image data from the input terminals 84, 85, and 86 have been synthesized in accordance with the α value are obtained from outputs of the output terminals 87, 88, and 89, respectively.

In FIG. 2, synthetic images in which the image data from the motion image input units 31 and 32 and the image data from the background image reading units 33 and 34 have been α-blended are obtained from the α blending synthesizing unit 51. The synthetic images are outputted from output terminals 55 and 56, respectively.

As mentioned above, in the blender 22 shown in FIG. 2, the α value rewriting units 41, 42, 43, and 44 are provided and the α value of each image data can be rewritten into a desired α value in a desired shape in a desired area.

Figure 5A:
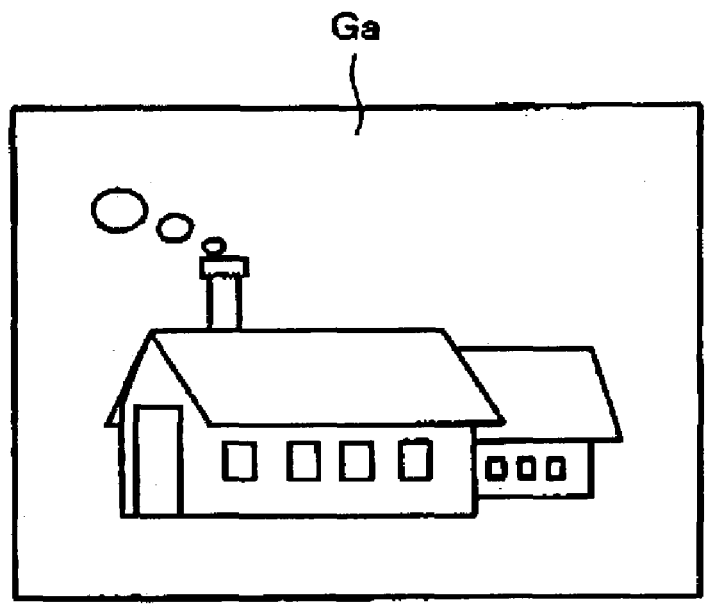
FIGS. 5A and 5B are schematic diagrams for use in explanation of the blender to which the invention is applied.
Figure 5B:
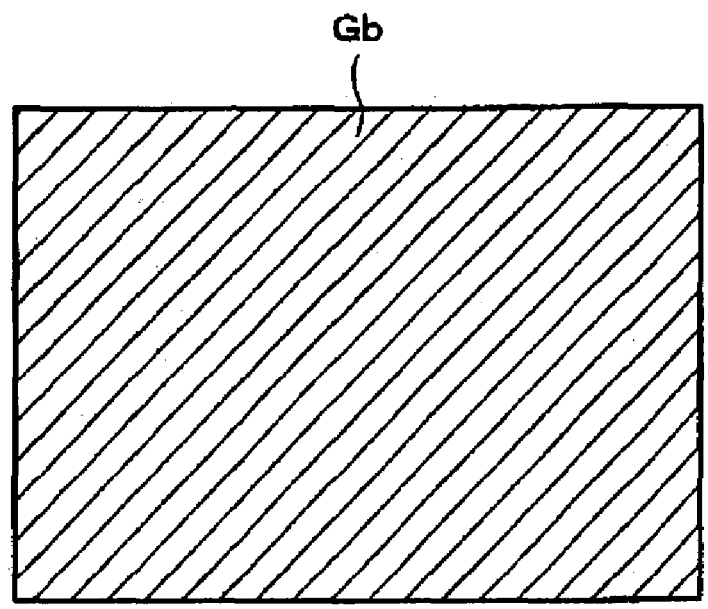

For example, it is now assumed that image data of a motion image Ga as shown in FIG. 5A has been inputted to the motion image input unit 31 and image data of a background image Gb as shown in FIG. 5B has been inputted to the background image reading unit 33. It is also assumed that a priority of the motion image Ga is higher than that of the background image Gb.

Figure 6A:
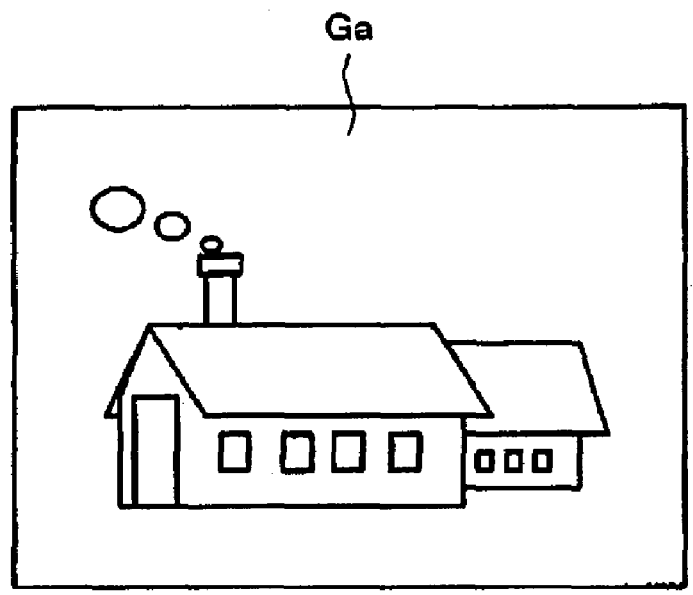
FIGS. 6A and 6B are schematic diagrams for use in explanation of the blender to which the invention is applied.

When the image data of the motion image Ga and the image data of the background image Gb are synthesized in the α blending synthesizing unit 51, assuming that the original α value of the image data of the motion image Ga sent to the motion image input unit 31 is equal to "1", the image Ga becomes opaque. As shown in FIG. 6A, the background image Gb is hidden under the motion image Ga, so that it cannot be seen.

Figure 6B:
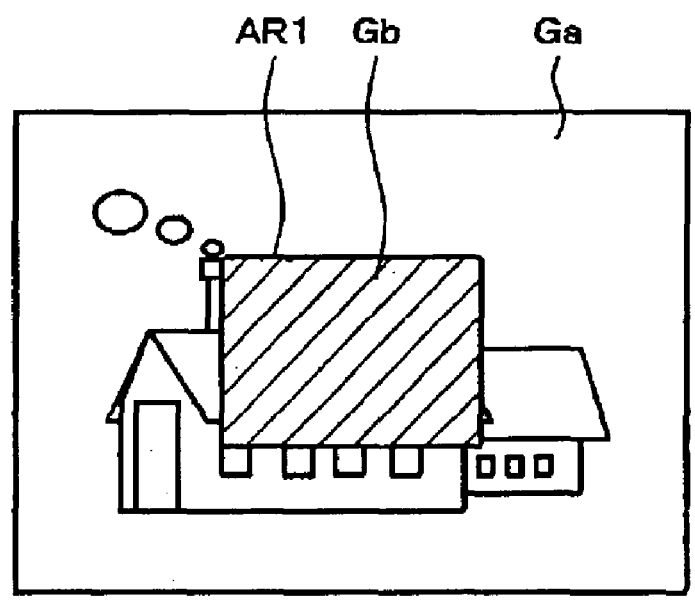

An output destination side of the image data from the motion image input unit 31 is set to the area setting signal generating unit 53, parameters such that a quadrangular shape is obtained in a position and a range of an area AR1 are set, and the rewriting α value is set to "0". Thus, in FIG. 6B, in the area AR1, the area setting signal is generated from the area setting signal generating unit 53. The α value in the image data of the motion image Ga within the area AR1 is rewritten to "0". Thus, if the image data of the motion image Ga and the image data of the background image Gb are synthesized, in the area AR1, a display screen such that the background image Gb appears is obtained as shown in FIG. 6B.

If the area AR1 where the α value is rewritten is gradually changed with the elapse of the time, an image process such as a wiping process can be realized by hardware. If the α value to be rewritten is gradually changed with the elapse of the time, a process such that the background image appears or disappears gradually can be executed by hardware.

The area setting signal generating unit 53 for generating the area setting signal in the rewriting area in a desired shape in a desired position as mentioned above will now be described.

As mentioned above, the parameters comprising the shape information on the rewriting destination side, the position information on the rewriting destination side, the range information on the rewriting destination side, and the output destination information are supplied to the area setting signal generating unit 53. The output position information of the present image is also supplied from the motion image input units 31 and 32 to the area setting signal generating unit 53. When the position set by the parameters comes, the area setting signal is generated in the area in a desired shape from the area setting signal generating unit 53 to the α value rewriting units 41, 42, 43, and 44 set as output destination sides.

Figure 7:
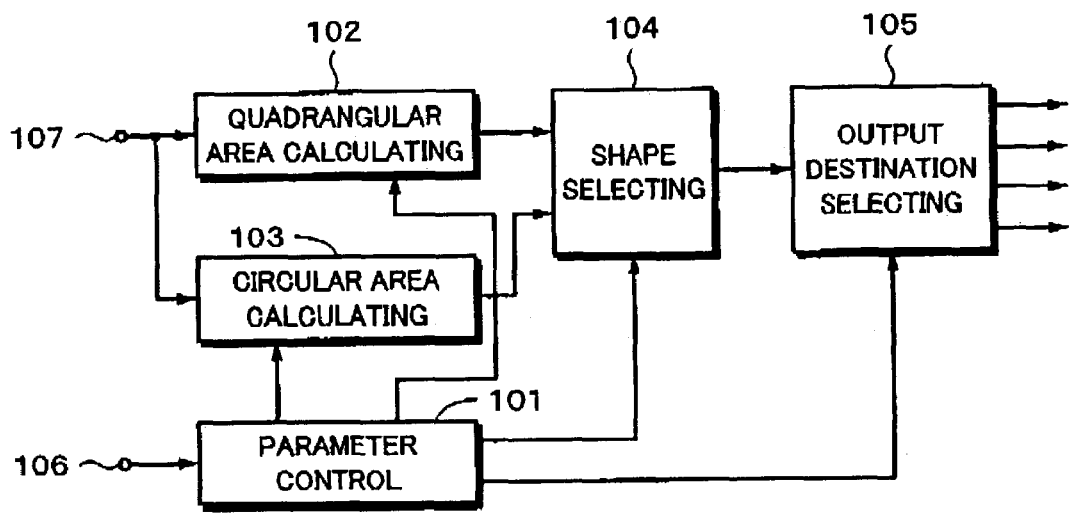
FIG. 7 is a block diagram of an example of an area setting signal generating unit.

As shown in FIG. 7, the area setting signal generating unit 53 comprises: a parameter control unit 101; a quadrangular area calculating unit 102, a circular area calculating unit 103; a shape selecting unit 104; and an output destination selecting unit 105.

Although the quadrangular area calculating unit 102 for generating the quadrangular shape and the circular area calculating unit 103 for generating the circular shape have been provided here, other shape area calculating units of various shapes such as star, triangle, and the like are further provided, thereby enabling the various shapes to be also designated.

The parameters are supplied from an input terminal 106 to the parameter control unit 101. The parameters comprise: the shape information on the rewriting destination side; the position information on the rewriting destination side; the range information on the rewriting destination side; and the output destination information.

The shape information on the rewriting destination side is information showing the shape in which the α value is rewritten and is set to "quadrangle" or "circle" here. The shape information on the rewriting destination side is transmitted from the parameter control unit 101 to the shape selecting unit 104.

The position information on the rewriting destination side and the range information on the rewriting destination side are information showing the position and range of the area in which the α value is rewritten. The position information on the rewriting destination side and the range information on the rewriting destination side are transmitted from the parameter control unit 101 to the quadrangular area calculating unit 102 and the circular area calculating unit 103.

The output destination information designates the image data in which the α value is rewritten. The output destination information is sent to the output destination selecting unit 105.

The position information of the present image is supplied to an input terminal 107 from the motion image input unit 31 or 32. The position information of the present image is supplied to the quadrangular area calculating unit 102 and the circular area calculating unit 103.

The quadrangular area calculating unit 102 sets the quadrangular area on the basis of the position information on the rewriting destination side and the range information on the rewriting destination side from the parameter control unit 101. If the present position information from the input terminal 107 enters the range of the set quadrangular area, the quadrangular area calculating unit 102 generates the area setting signal.

The circular area calculating unit 103 sets the circular area on the basis of the position information on the rewriting destination side and the range information on the rewriting destination side from the parameter control unit 101. If the present position information from the input terminal 107 enters the range of the set circular area, the circular area calculating unit 103 generates the area setting signal.

An output of the quadrangular area calculating unit 102 is supplied to the shape selecting unit 104. An output of the circular area calculating unit 103 is supplied to the shape selecting unit 104.

The shape information on the rewriting destination side is supplied to the shape selecting unit 104 from the parameter control unit 101. The shape selecting unit 104 selects the area setting signal in accordance with whether the shape information indicates "quadrangle" or "circle".

If the shape information on the rewriting destination side indicates "quadrangle", the output of the quadrangular area calculating unit 102 is selected. The area setting signal from the quadrangular area calculating unit 102 is supplied to the output destination selecting unit 105 via the shape selecting unit 104. If the shape information on the rewriting destination side indicates "circle", the output of the circular area calculating unit 103 is selected. The area setting signal from the circular area calculating unit 103 is supplied to the output destination selecting unit 105 via the shape selecting unit 104.

Information on the output destination side is supplied to the output destination selecting unit 105 from the parameter control unit 101. An output destination of the area setting signal is determined in accordance with the information on the output destination side.

As output destinations, there are an output corresponding to the image data from the motion image input unit 31, an output corresponding to the image data from the motion image input unit 32, an output corresponding to the image data from the background image reading unit 33, and an output corresponding to the image data from the background image reading unit 34 in FIG. 2.

In the case of rewriting the α value with respect to the image data from the motion image input unit 31, the output destination selecting unit 105 is switched so that the area setting signal from the output destination selecting unit 105 is outputted to the α value rewriting unit 41. In the case of rewriting the α value with respect to the image data from the motion image input unit 32, the output destination selecting unit 105 is switched so that the area setting signal from the output destination selecting unit 105 is outputted to the α value rewriting unit 42. In the case of rewriting the α value with respect to the image data from the background image reading unit 33, the output destination selecting unit 105 is switched so that the area setting signal from the output destination selecting unit 105 is outputted to the α value rewriting unit 43. In the case of rewriting the α value with respect to the image data from the background image reading unit 34, the output destination selecting unit 105 is switched so that the area setting signal from the output destination selecting unit 105 is outputted to the α value rewriting unit 44.

Figure 8:
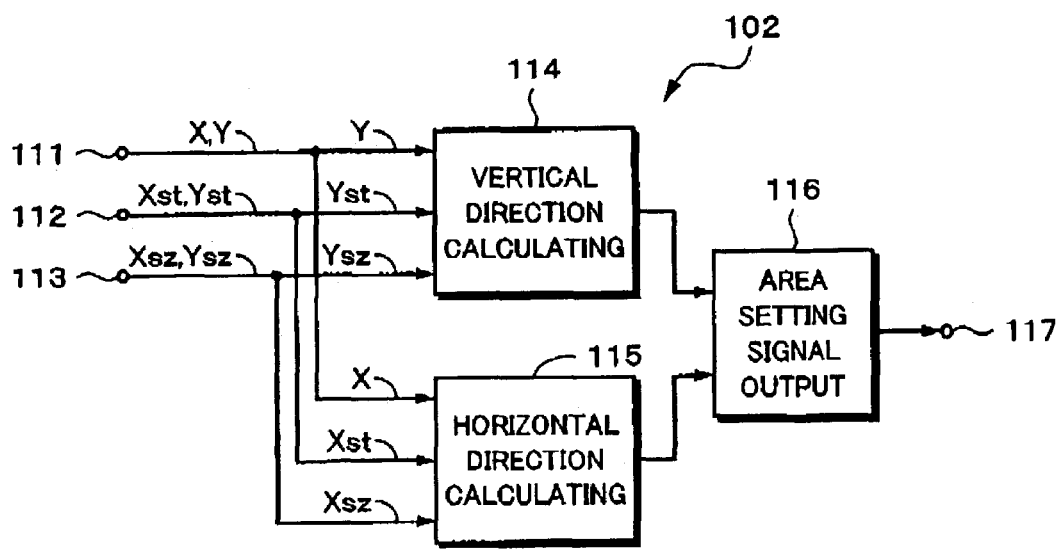
FIG. 8 is a block diagram of an example of a quadrangular area calculating unit.

FIG. 8 shows a construction of the quadrangular area calculating unit 102. As mentioned above, the quadrangular area calculating unit 102 sets the quadrangular area of a desired size in a desired position on the basis of the position information on the rewriting destination side and the range information on the rewriting destination side from the parameter control unit 101. If the position information of the present image enters the quadrangular area set on the basis of the position information on the rewriting destination side and the range information on the rewriting destination side, the quadrangular area calculating unit 102 generates the area setting signal.

As shown in FIG. 8, the quadrangular area calculating unit 102 comprises: a vertical direction calculating unit 114 for outputting an area setting signal in the vertical direction: a horizontal direction calculating unit 115 for outputting an area setting signal in the horizontal direction; and an area setting signal output unit 116 for forming an area setting signal from an output of the vertical direction calculating unit 114 and an output of the horizontal direction calculating unit 115.

In FIG. 8, the position information of the present image is supplied to an input terminal 111. The present image position information is coordinates (X, Y) in the horizontal direction and the vertical direction of the present display position which is sent from the motion image input unit 31 or 32 (FIG. 2).

The position information on the rewriting destination side is supplied to an input terminal 112. The position information on the rewriting destination side designates a start position of a portion of each image in which the α value is rewritten. If the shape on the rewriting destination side is "quadrangle", the position information on the rewriting destination side is coordinates (Xst, Yst) in the horizontal direction and the vertical direction of a vertex of an upper left corner of the quadrangle.

The range information on the rewriting destination side is supplied to an input terminal 113. The range information on the rewriting destination side is size information (Xsz, Ysz) showing distances in the horizontal direction and the vertical direction from the coordinates of the vertex of an upper left corner of the quadrangle serving as a start position on the rewriting destination side.

Position information Y in the vertical direction in the position information of the present image from the input terminal 111 is supplied to the vertical direction calculating unit 114. Position information X in the horizontal direction is supplied to the horizontal direction calculating unit 115.

Information Yst of the start position in the vertical direction in the position information on the rewriting destination side from the input terminal 112 is supplied to the vertical direction calculating unit 114. Information Xst of the start position in the horizontal direction is supplied to the horizontal direction calculating unit 115.

Size information Ysz in the vertical direction in the range information on the rewriting destination side from the input terminal 113 is supplied to the vertical direction calculating unit 114. Information Xsz in the horizontal direction is supplied to the horizontal direction calculating unit 115.

In the vertical direction calculating unit 114, a range in the vertical direction of the quadrangular shape on the rewriting destination side is set on the basis of the start position information Yst in the vertical direction on the rewriting destination side and the size information Ysz in the vertical direction. When a position Y in the vertical direction of the present image enters the set range in the vertical direction of the quadrangular shape on the rewriting destination side, the area setting signal in the vertical direction is outputted from the vertical direction calculating unit 114. This area setting signal in the vertical direction is supplied to the area setting signal output unit 116.

Similarly, in the horizontal direction calculating unit 115, a range in the horizontal direction of the quadrangular shape on the rewriting destination side is set on the basis of the start position information Xst in the horizontal direction on the rewriting destination side and the size information Xsz in the horizontal direction. When a position X in the horizontal direction of the present image enters the set range in the horizontal direction of the quadrangular shape on the rewriting destination side, the area setting signal in the horizontal direction is outputted from the horizontal direction calculating unit 115. This area setting signal in the horizontal direction is supplied to the area setting signal output unit 116.

The area setting signal output unit 116 outputs the area setting signal on the basis of an output of the vertical direction calculating unit 114 and an output of the horizontal direction calculating unit 115. The area setting signal is outputted from an output terminal 117.

Figure 9:
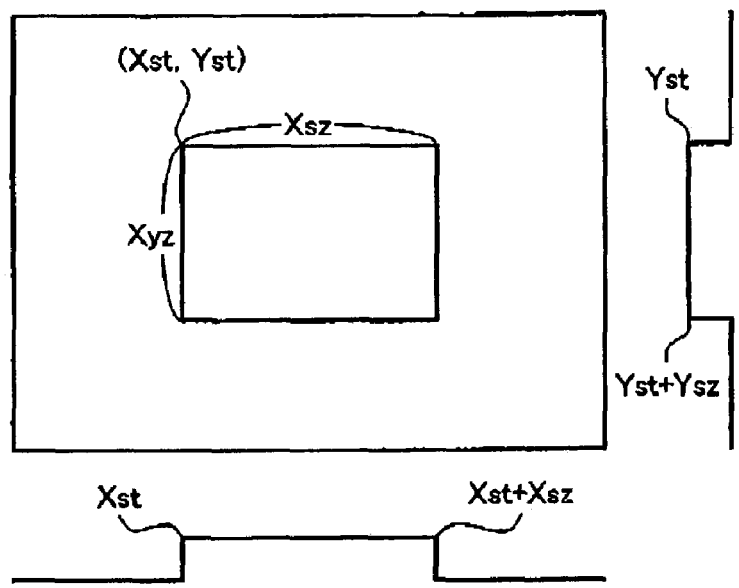
FIGS. 9A to 9C are schematic diagrams for use in explanation of the quadrangular area calculating unit.

For example, it is assumed that a range of a quadrangular shape as shown in FIG. 9A is set as a change area of the α value. The coordinates (Xst, Yst) of the upper right corner of the quadrangular shape are set to the start position information on the rewriting destination side in the horizontal direction and the vertical direction. Information of a start point Xst in the horizontal direction and information of a start point Yst in the vertical direction are supplied to the input terminal 112. A size Xsz in the horizontal direction and a size Ysz in the vertical direction from the coordinates (Xst, Yst) are supplied as range information on the rewriting destination side to the input terminal 113.

In the horizontal direction calculating unit 115, a rewriting area in the horizontal direction is set on the basis of the horizontal direction start point Xst and the horizontal direction size Xsz. That is, in the quadrangular shape shown in FIG. 9A, the range in the horizontal direction of the quadrangle lies within a range from the horizontal direction start point Xst to the position where the horizontal direction size Xsz has been added to the horizontal direction start point Xst. Therefore, a range from (X=Xst) to (X=Xst+Xsz) is set as a rewriting area in the horizontal direction.

Similarly, in the vertical direction calculating unit 114, a rewriting area in the vertical direction is set on the basis of the vertical direction start point Yst and the vertical direction size Ysz. In the quadrangular shape shown in FIG. 9A, the range in the vertical direction lies within a range from the vertical direction start point Yst to the position where the vertical direction size Ysz has been added to the vertical direction start point Yst. Therefore, a range from (Y=Yst) to (Y=Yst+Ysz) is set as a rewriting area in the vertical direction.

As shown in FIG. 9B, when the position in the horizontal direction enters the rewriting area in the horizontal direction set by the horizontal direction calculating unit 115, the area setting signal in the horizontal direction is outputted from the horizontal direction calculating unit 115. As shown in FIG. 9C, when the position in the vertical direction enters the rewriting area in the vertical direction set by the vertical direction calculating unit 114, the area setting signal in the vertical direction is outputted from the vertical direction calculating unit 114.

The area setting signal in the horizontal direction from the horizontal direction calculating unit 115 and the area setting signal in the vertical direction from the vertical direction calculating unit 114 are supplied to the area setting signal output unit 116. While the area setting signal in the vertical direction is being outputted from the vertical direction calculating unit 114 and while the area setting signal in the horizontal direction is being outputted from the horizontal direction calculating unit 115, the area setting signal is outputted from the area setting signal output unit 116. This area setting signal is outputted from the output terminal 117.

Figure 10:
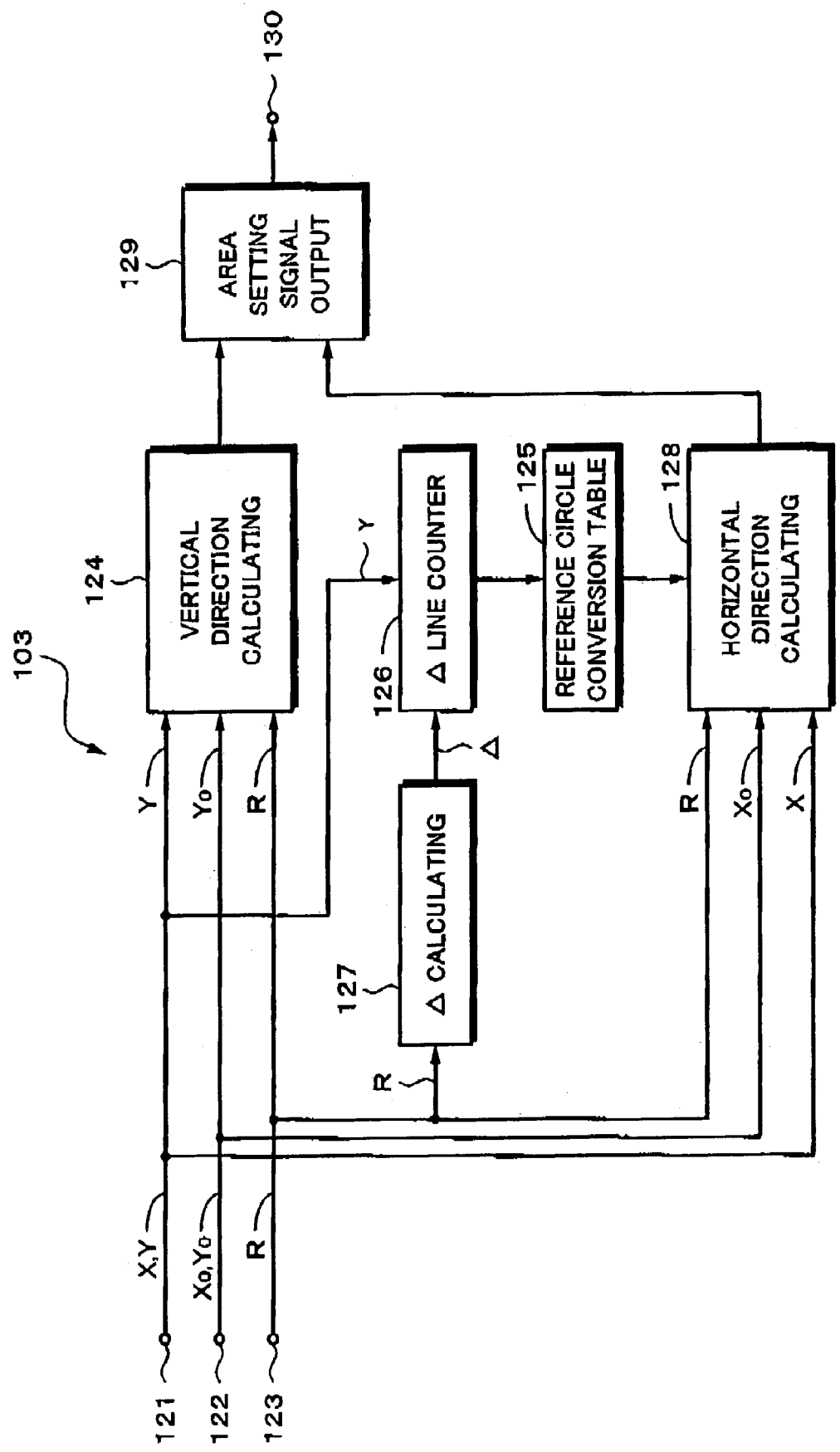
FIG. 10 is a block diagram of an example of a circular area calculating unit.

FIG. 10 shows a construction of the circular area calculating unit 103. The circular area calculating unit 103 sets a circular area of a desired size in a desired position on the basis of the position information on the rewriting destination side and the range information on the rewriting destination side from the parameter control unit 101. If the present image position information enters the circular area set on the basis of the position information on the rewriting destination side and the range information on the rewriting destination side, the circular area calculating unit 103 generates the area setting signal.

Although there is a method of calculating by using an expression showing a circle in order to set the circular area, calculation of a square or calculation of a trigonometric function is necessary for the calculation of the circular area, so that it is difficult to execute a real-time process. In this example, therefore, a table in which size information in the horizontal direction regarding a position of a reference circle in the vertical direction has been stored is prepared and a rewriting range of the circle is set by using this table.

As shown in FIG. 10, the circular area calculating unit 103 comprises: a vertical direction calculating unit 124 for setting a rewriting area in the vertical direction; a reference circle conversion table 125; a Δ line counter 126; a Δ calculating unit 127; a horizontal direction calculating unit 128 for outputting an area setting signal in the horizontal direction; and an area setting signal output unit 129 for forming an area setting signal from an output of the vertical direction calculating unit 124 and an output of the horizontal direction calculating unit 128.

In FIG. 10, the position information of the present image is supplied to an input terminal 121. The present image position information is the coordinates (X, Y) in the horizontal direction and the vertical direction of the present display position which is sent from the motion image input unit 31 or 32 (FIG. 2).

The position information on the rewriting destination side is supplied to an input terminal 122. The position information on the rewriting destination side designates a position of a portion of each image in which the α value is rewritten. If the shape on the rewriting destination side is "circle", the position information on the rewriting destination side is coordinates (X0, Y0) in the horizontal direction and the vertical direction of a center of the circle.

The range information on the rewriting destination side is supplied to an input terminal 123. The range information on the rewriting destination side is size information R showing a radius of the circle.

The position information Y in the vertical direction in the position information of the present image from the input terminal 121 is supplied to the vertical direction calculating unit 124. Position information X in the horizontal direction is supplied to the horizontal direction calculating unit 128. Position information Y in the vertical direction in the position information of the present image is supplied to the Δ line counter 126.

Position information (position Y0 in the vertical direction of the center of the circle) in the vertical direction in the position information on the rewriting destination side from the input terminal 122 is supplied to the vertical direction calculating unit 124. Position information (position X0 in the horizontal direction of the circle) in the horizontal direction is supplied to the horizontal direction calculating unit 128.

Range information (radius R of the circle) on the rewriting destination side from the input terminal 123 is supplied to the vertical direction calculating unit 124 and the horizontal direction calculating unit 128 and is also supplied to the Δ calculating unit 127.

In the vertical direction calculating unit 124, a range in the vertical direction of the circular shape on the rewriting destination side is set on the basis of the position information Y0 in the vertical direction of the center of the circle and the size information R of the radius of the circle. When the position in the vertical direction of the present image enters the set range in the vertical direction of the circular shape on the rewriting destination side, the area setting signal in the vertical direction is outputted from the vertical direction calculating unit 124. This area setting signal in the vertical direction is supplied to the area setting signal output unit 129.

Figures 11, 12:
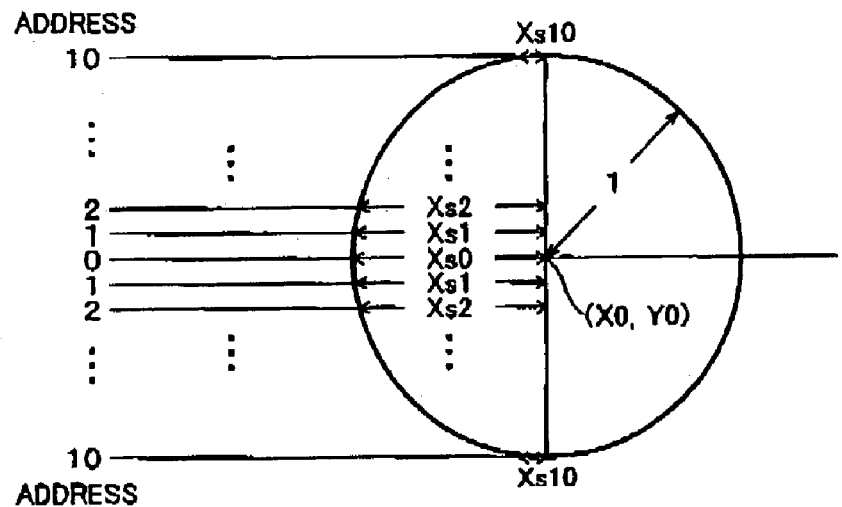
FIG. 11 is a schematic diagram for use in explanation of a reference circle conversion table.
FIG. 12 is a schematic diagram for use in explanation of a reference circle conversion table.

Size information in the horizontal direction for the position in the vertical direction of a unit circle serving as a reference has been stored in the reference circle conversion table 125. That is, as shown in FIG. 11, the circle of the radius "1" serving as a reference is prepared. Sizes Xs0, Xs1, Xs2, . . . in the horizontal direction for the position in the vertical direction of the circle serving as a reference are obtained. The reference circle conversion table 125 in which size information (Xuni=Xs0, Xs1, Xs2, . . . ) in the horizontal direction for the position in the vertical direction of the reference circle has been stored is formed from the sizes Xs0, Xs1, Xs2, . . . in the horizontal direction for the position in the vertical direction of the reference circle as shown in FIG. 12.

In the reference circle conversion table 125, a size from the center position X0 in the horizontal direction for the center position Y0 in the vertical direction of the circle of the radius "1" is assumed to be the size Xs0 in the horizontal direction in address "0". Sizes from the center position X0 in the horizontal direction at positions which are away from the center position Y0 in the vertical direction of the circle at regular intervals to (the upper direction or the lower direction) are assumed to be size information in the horizontal direction in addresses "1", "2", . . . The reference circle conversion table 125 can be constructed by a memory such as ROM, RAMS or the like.

In FIG. 10, the radius information R of the circle is supplied to the Δ calculating unit 127. A unit vertical direction change amount Δ is obtained by the Δ calculating unit 127.

Figure 13:
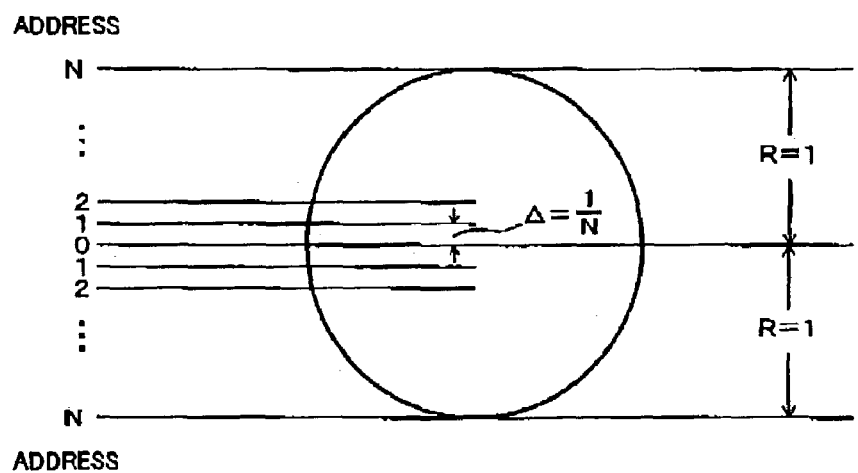
FIG. 13 is a schematic diagram for use in explanation of a Δ calculating unit.

That is, as shown in FIG. 11, data in the reference circle conversion table 125 is made by the unit circle of the radius "1". As shown in FIG. 13, assuming that the number of entries of the table is equal to N, when the address in the reference circle conversion table 125 is incremented from "0" to "N", the size in the vertical direction is increased by the length of the radius R (R=1). In this case, the operation such that the address in the reference circle conversion table 125 is incremented by "1" corresponds to that the size is changed by "1/N" in the vertical direction.

Figure 14:
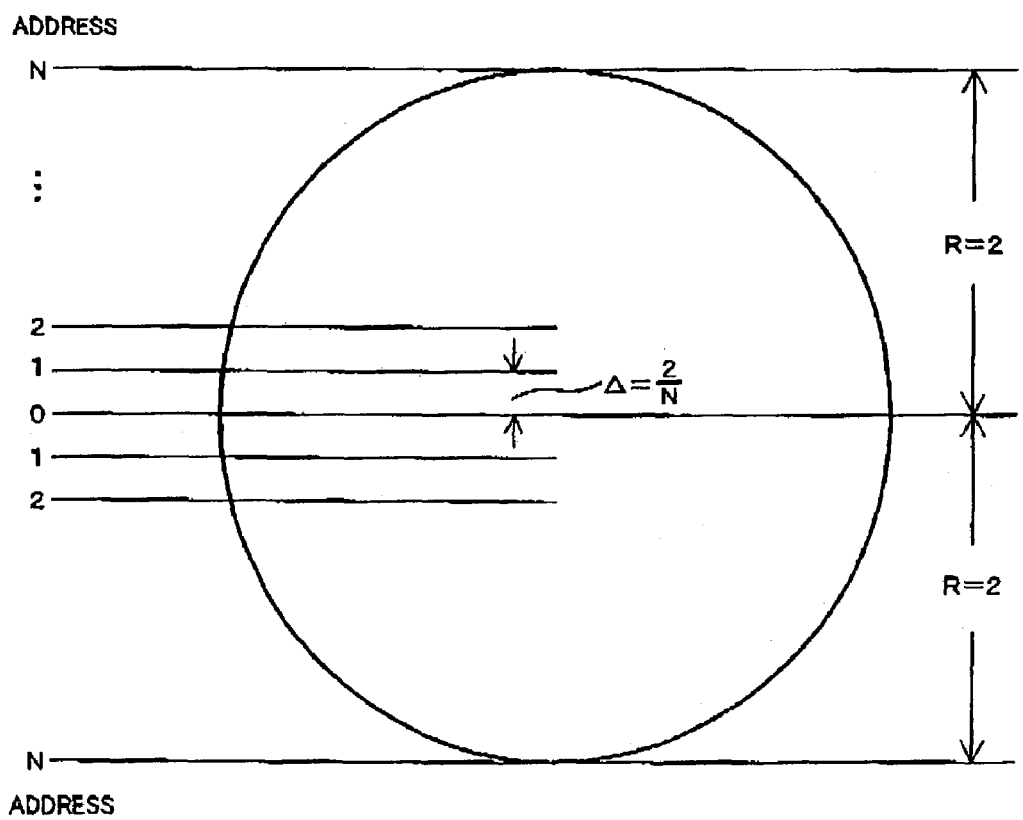
FIG. 14 is a schematic diagram for use in explanation of a Δ calculating unit.

Assuming that it is intended to obtain a range of a radius "2" by using the same table, when the address is incremented from "0" to "N", the size in the vertical direction is increased by the length of the radius R (R=2). Therefore, as shown in FIG. 14, the operation such that the address in the reference circle conversion table 125 is incremented by "1" corresponds to that the size is changed by "2/N" in the vertical direction.

Now assuming that N denotes the number of entries of the reference circle conversion table 125 and R Indicates the radius, (R/N) is defined as a unit vertical direction change amount Δ. The unit vertical direction change amount (Δ=R/N) indicates a change amount of the size in the vertical direction in the case where the address in the reference circle conversion table 125 is incremented by "1".

In FIG. 10, the radius information R is supplied from the input terminal 123 to the Δ calculating unit 127. In the Δ calculating unit 127, an arithmetic operation (R/N) is executed on the basis of the radius information R and the number of entries of the reference circle conversion table 125, so that the unit vertical direction change amount Δ is obtained.

An output of the Δ calculating unit 127 is supplied to the Δ line counter 126. The present position in the vertical direction is supplied from the input terminal 121 to the Δ line counter 126. When the present position in the vertical direction enters the rewriting range in the vertical direction, a count value of the Δ line counter 126 is incremented every the unit vertical direction change amount Δ. An output of the Δ line counter 126 is supplied to the reference circle conversion table 125. The Δ line counter 126 functions as an address generator for reading out the reference circle conversion table 125.

That is, assuming that the center position in the vertical direction of the circle is set to Y0 and the radius is equal to R, when the present position in the vertical direction enters a range in the vertical direction from (Y−R) to (Y+R), the count value of the Δ line counter 126 is incremented each time the position in the vertical direction is advanced by Δ.

At this time, while the position in the vertical direction lines within a range from (Y−R) to Y0, the count value of the Δ line counter 126 is incremented in descending order of N, (N−2), . . . , 1, and 0. While the position in the vertical direction lines within a range from Y0 to (Y−R), it is incremented in ascending order of 0, 1, 2, . . . , (N−2), (N−1), and N.

An output of the Δ line counter 126 is supplied as a read address to the reference circle conversion table 125. In the reference circle conversion table 125, the size data in the horizontal direction of each vertical position is read out on the basis of the output of the Δ line counter 126. An output of the reference circle conversion table 125 is supplied to the horizontal direction calculating unit 128.

In the horizontal direction calculating unit 128, an output of the reference circle conversion table 125 is multiplied by the number corresponding to the radius of the circle, so that it is converted into the size according to the radius of the circle. A rewriting range in the horizontal direction is set in accordance with the position in the vertical direction. When the position in the horizontal direction of the present image enters the rewriting range in the horizontal direction, the area setting signal in the horizontal direction is outputted from the horizontal direction calculating unit 128 and supplied to the area is setting signal output unit 129.

As mentioned above, in the circular area calculating unit 103 shown in FIG. 10, by reading out the reference circle conversion table 125 every vertical position, the rewriting range in the horizontal direction of the circle on the rewriting destination side is set.

That is, assuming that the coordinates of the center of the circle are set to (X0, Y0) and the radius is equal to R, when the present position Y in the vertical direction lies within a range (Y0−R≦Y<Y0), the rewriting range in the horizontal direction is set as follows.

$$Xst = X0 - Xuni \cdot R$$

$$Xen = X0 + Xuni \cdot R$$

where, Xst: start position of the rewriting range in the horizontal direction

Xen: end position of the rewriting range in the horizontal direction

Xuni: size data in the horizontal direction which is outputted from the table

The table is advanced in order of N, (N−2), . . . , 1, and 0 each time the position progresses by Δ in the vertical direction.

When the present position Y in the vertical direction lies within a range (Y0≦Y≦Y0+R), the rewriting range in the horizontal direction is set as follows.

$$Xst = X0 - Xuni \cdot R$$

$$Xen = X0 + Xuni \cdot R$$

where, Xst: start position of the rewriting range in the horizontal direction

Xen: end position of the rewriting range in the horizontal direction

Xuni: size data in the horizontal direction which is outputted from the table

The table is advanced in order of 0, 1, . . . , (N−2). (N−1), and N each time the position progresses by Δ in the vertical direction.

For example, it is now assumed that the number of entries of the reference circle conversion table 125 is equal to "10" and the size data Xuni (Xs0, Xs1, Xs2, . . . , Xs10) in the horizontal direction as shown in FIG. 12 has been accumulated in the reference circle conversion table 125. If the circle of the radius "1" is sat from the center position (X0, Y0) by using the reference circle conversion table 125, the area setting signal in the horizontal direction is outputted as shown in FIG. 15.

Figure 15:
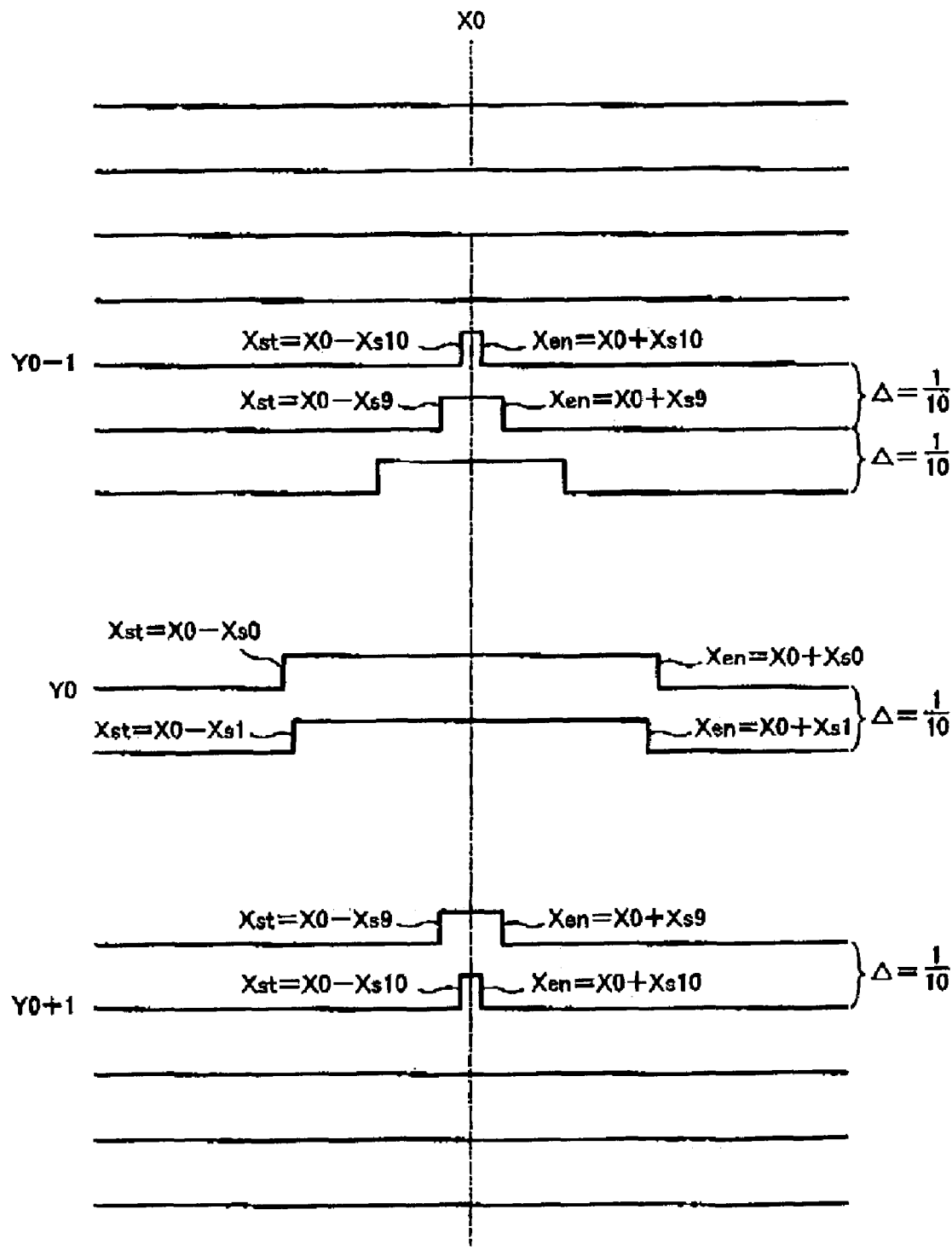
FIG. 15 is a schematic diagram for use in explanation of an example of the circular area calculating unit.

As shown in FIG. 15, in the case of setting the area of the circle of the radius "1", the unit vertical direction change amount Δ from the Δ calculating unit 127 is set to (Δ=1/10). When the present position Y in the vertical direction is set to (Y=Y0−1), address N (N=10) is read out and the data Xs10 is read out as a size in the horizontal direction. Thus, as shown in FIG. 15, the area setting signal in the horizontal direction is outputted while the position lies within a range from the start position Xst (Xst=X0−Xs10) in the horizontal direction to the end position Xen (Xen=X0+Xs10) in the horizontal direction.

When the present position Y in the vertical direction progresses therefrom by the unit vertical direction change amount Δ (Δ=1/10), address (N−1=9) is read out and Xs9 is read out as a size in the horizontal direction. The area setting signal in the horizontal direction is outputted while the position lies within a range from the start position Xst (Xst=X0−Xs9) in the horizontal direction to the end position Xen (Xen=X0+Xs9) in the horizontal direction.

While the present position Y in the vertical direction progresses from (Y=Y0−1) to (Y=Y0),the reference circle conversion table 125 is read out in order of addresses 10, 9, 8, . . . 1, and 0 every unit vertical direction change amount Δ (Δ=1/10). Thus, Xs10, Xs9, Xs8, . . . are sequentially read out as sizes in the horizontal direction. In accordance with them, the area setting signal in the horizontal direction is outputted while the position lies within a range from the start position Xst in the horizontal direction to the end position Xen in the horizontal direction as shown in FIG. 15.

When the present position Y in the vertical direction is set to (Y=Y0), address (N=0) in the reference circle conversion table 125 is read out and the data Xs0 is read out as a size in the horizontal direction. Thus, the area setting signal in the horizontal direction is outputted while the position lies within a range from the start position Xst (Xst=X0−Xs0) in the horizontal direction to the end position Xen (Xen=X0+Xs0) in the horizontal direction as shown in FIG. 15.

When the present position Y in the vertical direction progresses therefrom by the unit vertical direction change amount Δ (Δ=1/10), address (N=1) in the table is read out and Xs1 is read out as a size in the horizontal direction. The area setting signal in the horizontal direction is outputted while the position lies within a range from the start position Xst (Xst=X0−Xs1) in the horizontal direction to the end position Xen (Xen=X0+Xs1) in the horizontal direction.

While, the present position Y in the vertical direction position lies within a range from (Y=Y0) to (Y0+1), the table is read out in order of addresses 0, 1, 2, . . . , 9, and 10 every unit vertical direction change amount Δ. Thus, Xs0, Xs1, Xs2, . . . , are sequentially read out as sizes in the horizontal direction. In accordance with them, the area setting signal in the horizontal direction is outputted while the position lies within a range from the start position Xst in the horizontal direction to the end position Xen in the horizontal direction as shown in FIG. 15.

Figure 16:
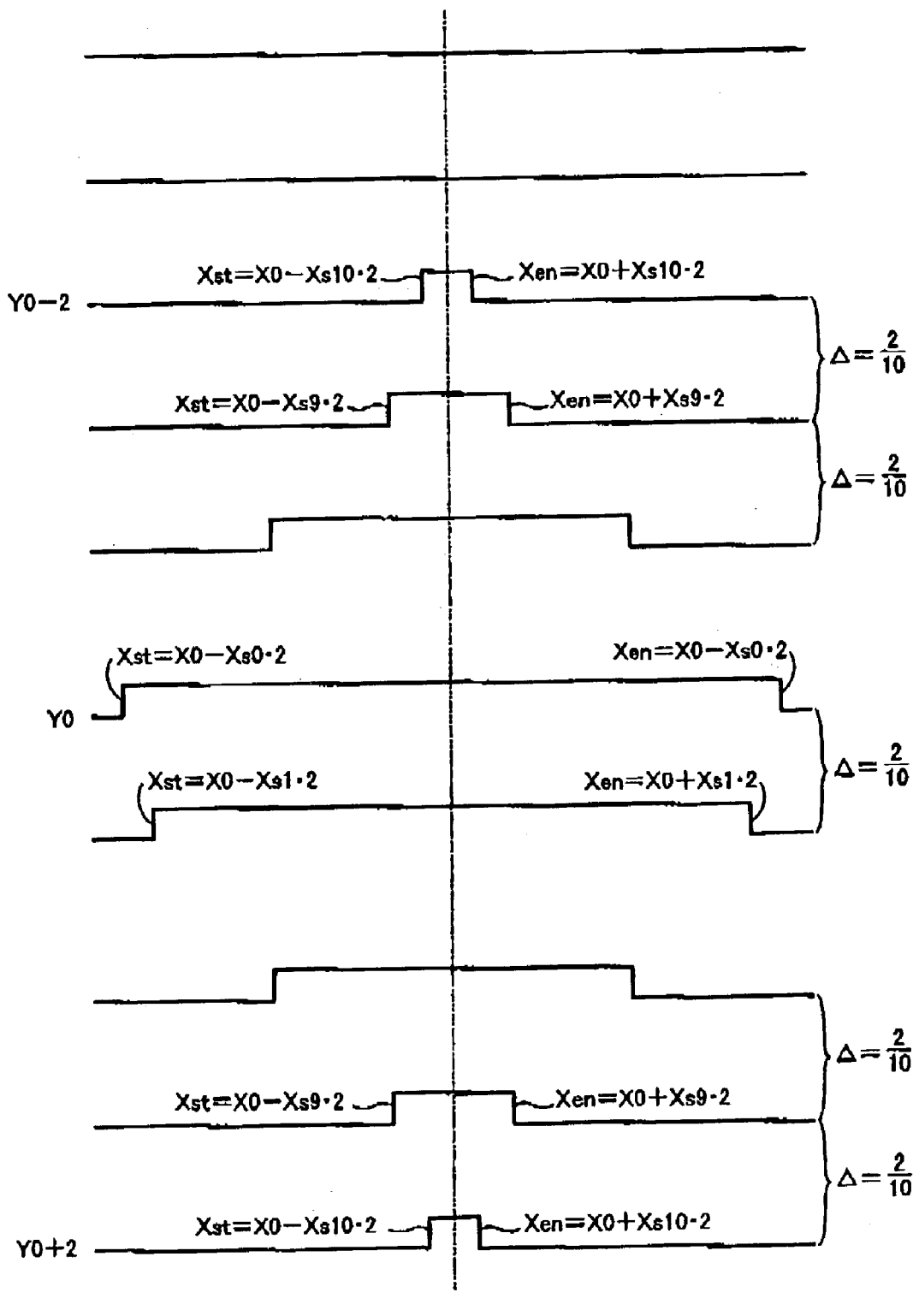
FIG. 16 is a schematic diagram for use in explanation of an example of the circular area calculating unit.

Subsequently, if the circle of the radius "2" is set from the center position (X0, Y0) by using the similar reference circle conversion table 125, the area setting signal in the horizontal direction is outputted as shown in FIG. 16.

In the case of setting the area of the circle of the radius "2", the unit vertical direction change amount Δ from the Δ calculating unit 127 is set to (Δ=2/10). When the present position Y in the vertical direction is set to (Y=Y0−2), address N (N=10) in the reference circle conversion table 125 shown in FIG. 12 is read out and the data Xs10 is read out as a size in the horizontal direction. The read-out data is doubled. Thus, as shown in FIG. 16, the area setting signal in the horizontal direction is outputted while the position lies within a range from the start position Xst (Xst=X0−Xs10·2) in the horizontal direction to the end position Xen (Xen=X0+Xs10·2) in the horizontal direction.

When the present position Y in the vertical direction progresses therefrom by the unit vertical direction change amount Δ (Δ=2/10), address (N−1=9) in the table is read out and Xs9 is read out as a size in the horizontal direction. This read-out data is doubled. Thus, the area setting signal in the horizontal direction is outputted while the position lies within a range from the start position Xst (Xst=X0−Xs9·2)

in the horizontal direction to the end position Xen (Xen=X0+Xs9·2) in the horizontal direction.

While the present position Y in the vertical direction lies within a range from (Y=Y0−2) to (Y=Y0), the reference circle conversion table 125 is read out in order of addresses 10, 9, . . . , 1, and 0. Thus, Xs10, Xs9, . . . , Xs1, and Xs0 are sequentially read out as sizes in the horizontal direction. In the case of the circle of the radius "2", the read-out size in the horizontal direction is doubled. In accordance with them, the area setting signal in the horizontal direction is outputted while the position lies within a range from the start position Xst in the horizontal direction to the end position Xen in the horizontal direction as shown in FIG. 16.

When the present position Y in the vertical direction is set to (Y=Y0), address (N=0) in the reference circle conversion table 125 is read out and the data Xs0 is read out as a size in the horizontal direction. This read-out data is read out. Thus, the area setting signal in the horizontal direction is outputted while the position lies within a range from the start position Xst (Xst=X0 −Xs0·2) in the horizontal direction to the end position Xen (Xen=X0+Xs0·2) in the horizontal direction as shown in FIG. 16.

When the present position Y in the vertical direction progresses therefrom by the unit vertical direction change amount Δ (Δ=2/10), address (N=1) in the table is read out and Xs1 is read out as a size in the horizontal direction. The read-out data is doubled. Thus, the area setting signal in the horizontal direction is outputted while the position lies within a range from the start position Xst (Xst=X0−Xs1·2) in the horizontal direction to the end position Xen (Xen=X0+Xs1·2) in the horizontal direction.

While the present position Y in the vertical direction position lies within a range from Y to (Y0+2), the table is read out in order of addresses 0, 1, 2, . . . , 9, and 10. Thus, Xs0,Xs1, Xs2, . . . are sequentially read out as sizes in the horizontal direction. In the case of the circle of the radius "2", the size in the horizontal direction of the read-out data is doubled. In accordance with them, the area setting signal in the horizontal direction is outputted while the position lies within a range from the start position Xst in the horizontal direction to the end position Xen in the horizontal direction as shown in FIG. 16.

As mentioned above, in FIG. 10, in the horizontal direction calculating unit 128, the range in the horizontal direction of the circular shape on the rewriting destination side is set every vertical position by using the reference circle conversion table 125. When the position in the horizontal direction of the present image enters the set range in the horizontal direction of the circular shape in the rewriting area, the area setting signal is outputted from the horizontal direction calculating unit 128. The area setting signal in the horizontal direction is supplied to the area setting signal output unit 129.

As mentioned above, in the vertical direction calculating unit 124, the range in the vertical direction of the circular shape on the rewriting destination side on the basis of the position information in the vertical direction of the center of the circle and the size information of the radius of the circle. The area setting signal in the vertical direction is supplied to the area setting signal output unit 129. When the position in the vertical direction of the present image enters the range in the vertical direction of the set circular shape on the rewriting destination side, the area setting signal in the vertical direction is outputted from the vertical direction calculating unit 124.

The area setting signal output unit 129 outputs the area setting signal on the basis of the output of the vertical direction calculating unit 124 and the output of the horizontal direction calculating unit 128. This area setting signal is outputted from an output terminal 130.

Figure 17A:
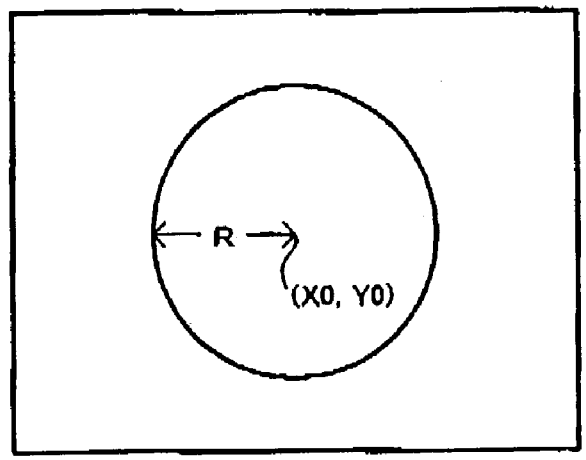
FIGS. 17A to 17C are schematic diagrams for use in explanation of an example of the circular area calculating unit.
Figure 17B:
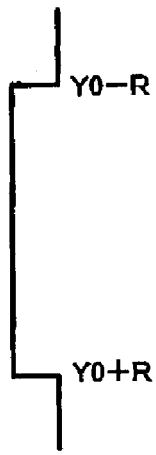

For example, if a range of a circular shape as shown in FIG. 17A is set as a change area of the α value, a range from the position (Y0−R) in which the radius R of the circle has been subtracted from the position Y0 in the vertical direction of the center of the circle to the position (Y0+R) in which the radius of the circle has been added to the position Y0 in the vertical direction of the center of the circle becomes the range in the vertical direction of the circular shape on the rewriting destination side. When the position in the vertical direction of the present image enters the range in the vertical direction of the circular shape on the rewriting destination side set as mentioned above, the area setting signal in the vertical direction is outputted from the vertical direction calculating unit 124 as shown in FIG. 17B.

Figure 17C:
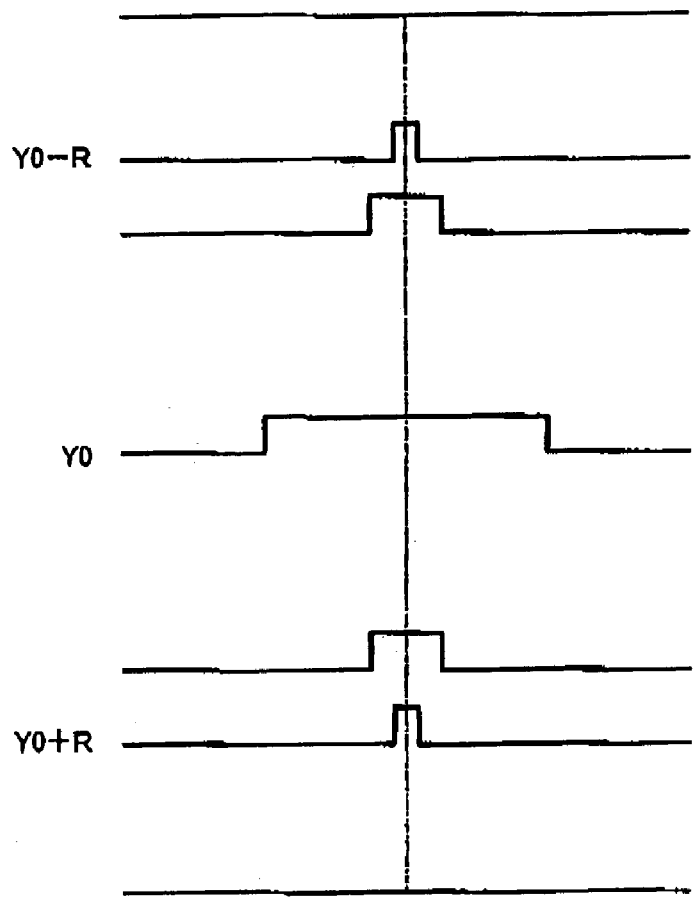
Figure 18:
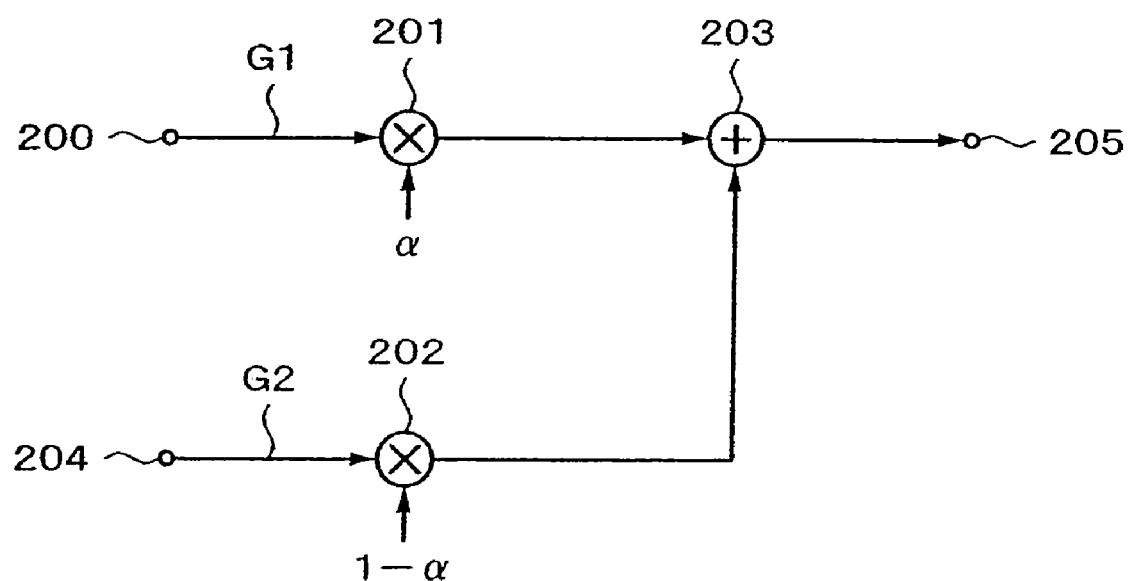
FIG. 18 is a block diagram for use in explanation of conventional α blending.
Figure 19:
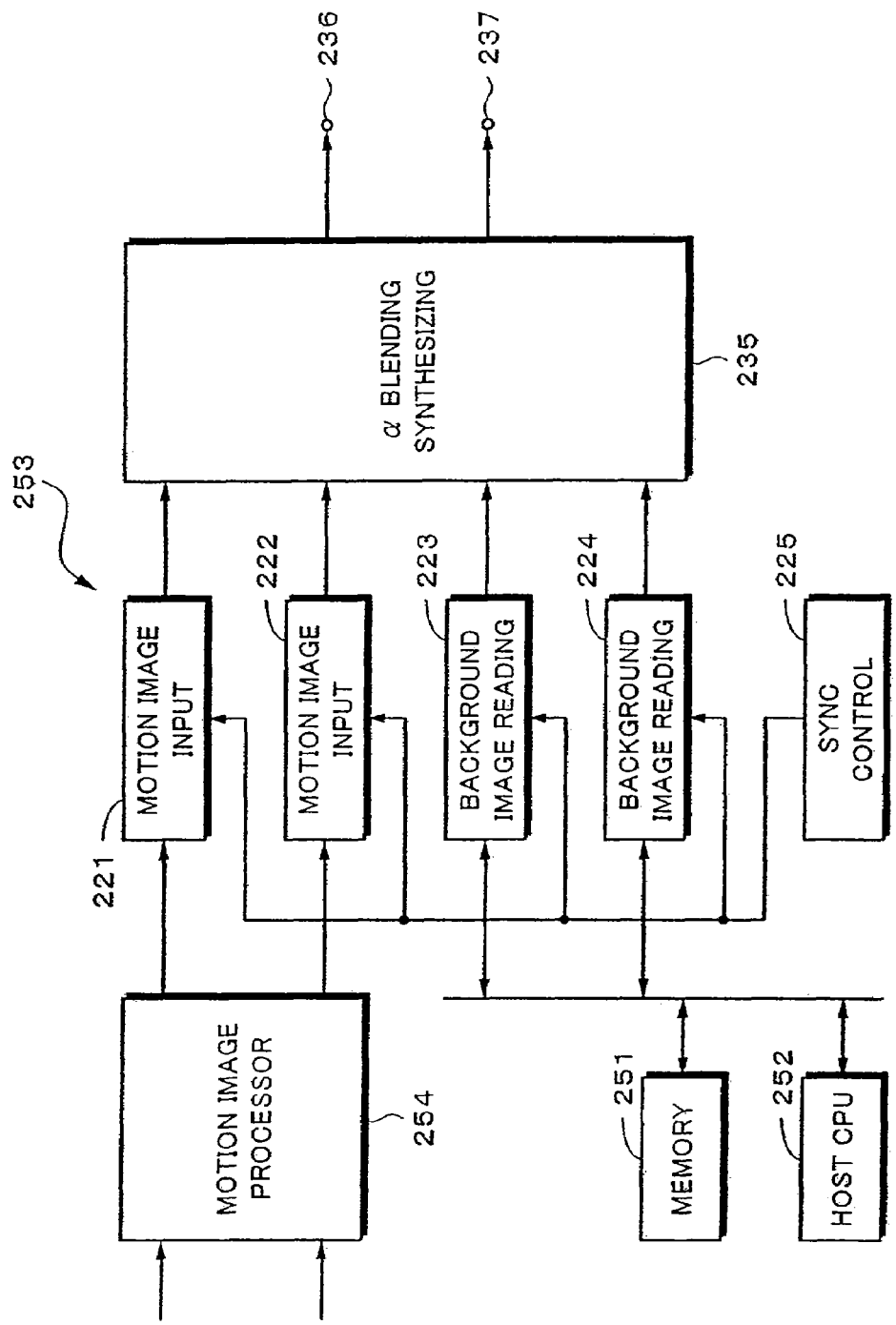
FIG. 19 is a block diagram for use in explanation of a conventional blender.

When the present vertical position lies within a range from (Y0−R) to (Y0+R), the rewriting area in the horizontal direction is set by using the output of the reference circle conversion table 125. When the position in the horizontal direction of the present image enters the range in the horizontal direction of the circular shape on the rewriting destination side set as mentioned above, the area setting signal in the horizontal direction is outputted from the horizontal direction calculating unit 128 as shown in FIG. 17C.

The area setting signal in the horizontal direction from the horizontal direction calculating unit 128 and the area setting signal in the vertical direction from the vertical direction calculating unit 124 are supplied to the area setting signal output unit 129. While the area setting signal in the vertical direction is being outputted from the vertical direction calculating unit 124 and while the area setting signal in the horizontal direction is being outputted from the horizontal direction calculating unit 128, the area setting signal is outputted from the area setting signal output unit 129. The area setting signal is outputted from the output terminal 130.

In the foregoing example, the Δ value is obtained from the information of the radius of the circle and the number N of entries by using the unit circle conversion table serving as a reference. By incrementing the address in the unit circle conversion table each time the position progresses by Δ in the vertical direction, the size of the circle in the vertical direction is corrected. By multiplying the output of the table by the radius of the circle, the size of circle in the horizontal direction is corrected. Naturally, it is also possible to prepare a number of conversion tables according to the sizes of circles and switch the tables in accordance with the size of circle.

In the foregoing example, the center position of the circle is designated and the sizes in the horizontal direction according to the positions in the vertical direction from the center position are accumulated. A method of forming the table and a method of providing the position of the circle are not limited to those mentioned above.

As described above, in the blender 22 to which the invention is applied, the α value in a desired shape in a desired position can be rewritten to a desired value in a desired range. If the area in which the α value is rewritten is changed with the elapse of time, the image process such as a wiping process can be realized by hardware. If the α value to be rewritten is gradually changed with the elapse of time, a process such that the background image appears or disappears gradually can be executed by hardware.

In the example, the area calculating unit of each shape is provided. In the area calculating unit of each shape, the rewriting area is set and when the present display position enters the rewriting area, the area setting signal is outputted. The α value which is obtained while the area setting signal is being outputted is rewritten. Therefore, the α value can be rewritten by a real-time process for the motion image.

Particularly, for the rewriting area of the circle, by using the reference circle conversion table, a complicated arithmetic operation is unnecessary and a high-speed process can be performed.

If a table of a triangle or a star is prepared in place of the reference circle conversion table, a rewriting area of the α value of the triangle or star can be set without using a complicated arithmetic operation.

Although the invention has been applied to the blender in the image processing chip in the foregoing example, the invention can be applied to all of the other blenders so long as the α blending of the image is executed.

According to the invention, the α value rewriting units for rewriting the α value indicative of the opaqueness degree of the image are provided. When a desired position comes, the area setting signal is outputted in a desired shape from the area setting signal generating unit. While the area setting signal is being outputted, the α value of the inputted image data can be rewritten to a desired value.

As mentioned above, the rewriting of the α value indicative of the opaqueness degree can be dynamically realized irrespective of the software. Therefore, the rewriting process of the opaqueness degree using the CPU which needs the transmission and reception of the data to/from the memory is unnecessary. The reduction of the processing time can be realized.

According to the invention, the opaqueness degree can be partially changed not only with respect to the image data which is read out from the memory but also with respect to image data which is directly inputted like a motion image. Since the reduction of the processing time is realized, a set value can be dynamically changed. By dynamically changing the opaqueness degree, the wiping process or an image process such that the image appears or disappears gradually can be realized.

According to the invention, by preparing the quadrangular area calculating unit and the circular area calculating unit, the quadrangular area and the circular area can be set by hardware. In the circular area calculating unit, by using the reference circle conversion table, the circular area can be set without executing the complicated arithmetic operation. Thus, the rewriting areas of the quadrangular shape and the circular shape can be set by the high-speed process.

The present invention is not limited to the foregoing embodiments but many modifications and variations are possible within the spirit and scope of the appended claims of the invention.

What is claimed is:

1. An image synthesizing apparatus comprising:
   input means for inputting image data including a value of an opaqueness degree;
   area setting means for setting a rewriting range of said opaqueness degree in a desired shape in a desired position and generating an area setting signal when a present position of said inputted image data enters said set rewriting range;
   opaqueness degree rewriting means for rewriting a value of the opaqueness degree of said inputted image data to a desired value while said area setting signal is being generated; and
   synthesizing means for synthesizing said inputted image data in which said opaqueness degree has been rewritten in said desired shape in said desired position and outputting second image data in accordance with the value of said rewritten opaqueness degree;
   wherein said inputted image data have priorities and wherein said inputted image data is synthesized using the value of said rewritten opaqueness degree of the inputted image having a higher priority.

2. An apparatus according to claim 1, wherein said area setting means includes quadrangular area setting means for setting a rewriting range of a quadrangular shape.

3. An apparatus according to claim 2, wherein said quadrangular area setting means comprises:
   horizontal direction calculating means for setting a rewriting range in a horizontal direction on the basis of a rewriting position in the horizontal direction and a rewriting size in the horizontal direction and, when a present horizontal position of said inputted image data enters said set rewriting range in the horizontal direction, outputting an area setting signal in the horizontal direction;
   vertical direction calculating means for setting a rewriting range in a vertical direction on the basis of a rewriting position in the vertical direction and a rewriting size in the vertical direction and, when a present vertical position of said inputted image data enters said set rewriting range in the vertical direction, outputting an area setting signal in the vertical direction: and
   area setting signal output means for forming an area setting signal for setting a rewriting area of the quadrangular shape on the basis of said area setting signal in the horizontal direction from said horizontal direction calculating means and said area setting signal in the vertical direction from said vertical direction calculating means.

4. An apparatus according to claim 1, wherein said area setting means includes circular area setting means for setting a rewriting range of a circular shape.

5. An apparatus according to claim 4, wherein said circular area setting means comprises:
   a conversion table in which sizes in a horizontal direction for a position in a vertical direction of a circle serving as a reference have been stored;
   address generating means for advancing an address in said conversion table in accordance with a present vertical position of said inputted image data;
   horizontal direction calculating means for setting a rewriting range in the horizontal direction on the basis of a rewriting position in the horizontal direction and an output of said conversion table and, when a present horizontal position of said inputted image data enters said set rewriting range in the horizontal direction, outputting an area setting signal in the horizontal direction;
   vertical direction calculating means for setting a rewriting range in the vertical direction on the basis of a rewriting position in the vertical direction and a size of the circle and, when the present vertical position of said inputted image data lies within said set rewriting range in the vertical direction, outputting an area setting signal in the vertical direction; and
   area setting signal output means for forming an area setting signal for setting a rewriting area of the circle on the basis of said area setting signal in the horizontal direction from said horizontal direction calculating means and said area setting signal in the vertical direction from said vertical direction calculating means.

6. An apparatus according to claim 5, wherein the size in the horizontal direction for the position in the vertical direction of the circle serving as a reference has been stored in said conversion table, the address to said conversion table is advanced in accordance with said size of said circle, and the output of said conversion table is corrected in accordance with said size of said circle.

7. An image synthesizing method comprising the steps of:
inputting image data including a value of an opaqueness degree;
setting a rewriting range of said opaqueness degree in a desired shape in a desired position and generating an area setting signal when a present position of said inputted image data enters said set rewriting range;
rewriting a value of the opaqueness degree of said inputted image data to a desired value while said area setting signal is being generated; and
synthesizing said inputted image data data in which said opaqueness degree has been rewritten in said desired shape in said desired position and outputting second image data in accordance with the value of said rewritten opaqueness degree;
wherein said inputted image data have priorities and wherein said inputted image data is synthesized using the value of said rewritten opaqueness degree of said inputted image data having a higher priority.

8. A method according to claim 7, wherein a rewriting range of a quadrangular shape is set by said area setting signal.

9. A method according to claim 8, wherein the area setting signal of said quadrangular shape is formed in a manner such that:
a rewriting range in a horizontal direction is set on the basis of a rewriting position in the horizontal direction and a rewriting size in the horizontal direction and, when a present horizontal position of said inputted image data enters said set rewriting range in the horizontal direction, an area setting signal in the horizontal direction is outputted;
a rewriting range in a vertical direction is set on the basis of a rewriting position in the vertical direction and a rewriting size in the vertical direction and, when a present vertical position of said inputted image data enters said set rewriting range in the vertical direction, an area setting signal in the vertical direction is outputted; and
an area setting signal for setting a rewriting area of the quadrangular shape is formed on the basis of said area setting signal in the horizontal direction and said area setting signal in the vertical direction.

10. A method according to claim 7, wherein a rewriting range of a circular shape is set by said area setting signal.

11. A method according to claim 10, wherein the area setting signal setting said circular shape is formed in a manner such that:
a conversion table in which sizes in a horizontal direction for a position in a vertical direction of a circle serving as a reference have been stored is provided;
an address in said conversion table is advanced in accordance with a present vertical position of said inputted image data;
a rewriting range in the horizontal direction is set on the basis of a rewriting position in the horizontal direction and an output of said conversion table and, when a present horizontal position of said inputted image data enters said set rewriting range in the horizontal direction, an area setting signal in the horizontal direction is outputted;
a rewriting range in the vertical direction is set on the basis of a rewriting position in the vertical direction and a size of the circle and, when the present vertical position of said inputted image data lies within said set rewriting range in the vertical direction,
an area setting signal in the vertical direction is outputted; and an area setting signal for setting a rewriting area of the circle is formed on the basis of said area setting signal in the horizontal direction and said area setting signal in the vertical direction.

12. A method according to claim 11, wherein the size in the horizontal direction for the position in the vertical direction of the circle serving as a reference has been stored in said conversion table, the address to said conversion table is advanced in accordance with said size of said circle, and the output of said conversion table is corrected in accordance with said size of said circle.

* * * * *